(12) United States Patent
Parida et al.

(10) Patent No.: US 11,995,907 B2
(45) Date of Patent: May 28, 2024

(54) DISTRIBUTED COMPUTER SYSTEM FOR DOCUMENT AUTHENTICATION

(71) Applicant: Amadeus S.A.S., Biot (FR)

(72) Inventors: Swagat Parida, Bangalore (IN); Renjith K. Sasidharan, Cochin (IN)

(73) Assignee: Amadeus S.A. S., Biot (FR)

( * ) Notice: Subject to any disclaimer, the term of this patent is extended or adjusted under 35 U.S.C. 154(b) by 214 days.

(21) Appl. No.: 17/569,051

(22) Filed: Jan. 5, 2022

(65) Prior Publication Data
US 2022/0237937 A1 Jul. 28, 2022

(30) Foreign Application Priority Data

Jan. 22, 2021 (EP) .................................. 21305081

(51) Int. Cl.
*G06V 30/413* (2022.01)
*G06V 10/26* (2022.01)
(Continued)

(52) U.S. Cl.
CPC ............ *G06V 30/413* (2022.01); *G06V 10/26* (2022.01); *G06V 10/762* (2022.01); *G06V 10/82* (2022.01); *G06V 30/19093* (2022.01)

(58) Field of Classification Search
CPC .... G06F 16/55; G06F 16/5846; G06F 40/131; G06F 40/20; G06F 40/216; G06F 40/242;
(Continued)

(56) References Cited

U.S. PATENT DOCUMENTS

| | | | |
|---|---|---|---|
| 11,087,125 B2 | 8/2021 | Cali et al. | |
| 2001/0019618 A1* | 9/2001 | Rhoads | G06K 19/06037 704/E19.009 |

(Continued)

FOREIGN PATENT DOCUMENTS

EP 3511868 A1 7/2019

OTHER PUBLICATIONS

M. Khalaf, H. Najm, A. A. Daleh, A. Hasan Munef and G. Mojib, "Schema Matching Using Word-level Clustering for Integrating Universities' Courses," 2020 2nd Al-Noor International Conference for Science and Technology (NICST), Baku, Azerbaijan, 2020, pp. 1-6, doi: 10.1109/NICST50904.2020.9280318. (Year: 2020).*

(Continued)

*Primary Examiner* — Michael J Vanchy, Jr.
(74) *Attorney, Agent, or Firm* — Thompson Hine LLP

(57) ABSTRACT

Methods and distributed computer devices for automatically determining whether a document is genuine. The method involves generating an image of the document, pre-processing of the image to obtain at least one segment of the image with an area of interest and dividing the at least one segment into portions containing single characters and/or combinations of characters. A validation of at least two single characters and/or at least two combinations of characters is performed for each of the single character and/or character combinations for at least two different categories. Score values are created for each category for each validated single character and/or character combination. Feature vectors are created for each single character and/or character combination, with the respective score values for each category as components. The method involves classifying the feature vectors to determine whether the single character or character combination to which the feature vector is associated is genuine.

19 Claims, 19 Drawing Sheets

(51) Int. Cl.
*G06V 10/762* (2022.01)
*G06V 10/82* (2022.01)
*G06V 30/19* (2022.01)

(58) Field of Classification Search
CPC ...... G06F 40/279; G06F 40/284; G06F 40/30; G06V 10/26; G06V 10/762; G06V 10/82; G06V 30/10; G06V 30/19093; G06V 30/40; G06V 30/413; G07D 7/0043; G07D 7/206; G06K 9/00442; G06K 9/00456; G06K 9/00463; G06K 9/6218; G06N 3/04; G06N 3/0454; G06N 3/08; G06N 3/084
See application file for complete search history.

(56) References Cited

U.S. PATENT DOCUMENTS

| | | | | |
|---|---|---|---|---|
| 2007/0143158 | A1* | 6/2007 | Cordery | G07D 7/206 |
| | | | | 382/112 |
| 2012/0059745 | A1 | 3/2012 | Fredericks et al. | |
| 2013/0279759 | A1* | 10/2013 | Kagarlitsky | G06V 30/1902 |
| | | | | 382/105 |
| 2019/0213408 | A1* | 7/2019 | Cali | G06V 30/414 |
| 2021/0124919 | A1* | 4/2021 | Balakrishnan | G06V 30/416 |

OTHER PUBLICATIONS

R.Bertrand,P.Gomez-Kramer,O.R. Terrades,P.FrancoandJ.-M. Ogier, "ASystem BasedonIntrinsicFeaturesforFraudulent DocumentDetection," 201312thInternationalConferenceonDocumentAnalysisandRecognition,Washington,DC,USA,2013,pp. 106-110, doi:10.1109/ICDAR.2013.29. (Year: 2013).*

EP, European Patent Office, Extended Search Report and Written Opinion issued in Patent Application No. 21305081.8, 9 pages (Jun. 16, 2021).

Bertrand, R. et al., "A System Based on Intrinsic Features for Fraudulent Document Detection," 2013 12th International Conference on Document Analysis and Recognition, IEEE, pp. 106-110, XP032502764 (Aug. 25, 2013).

* cited by examiner

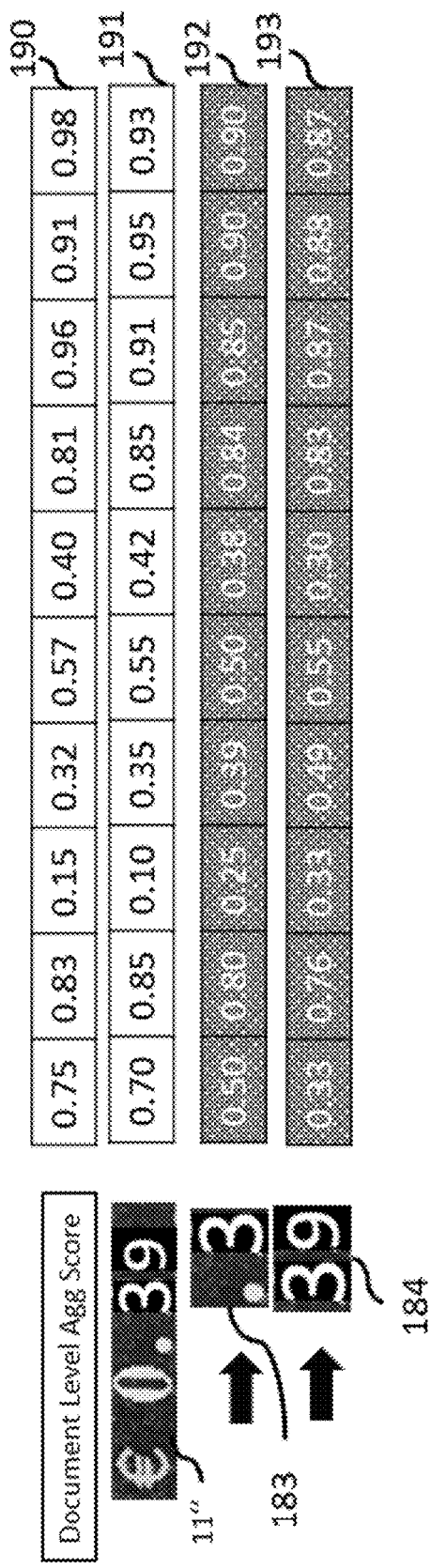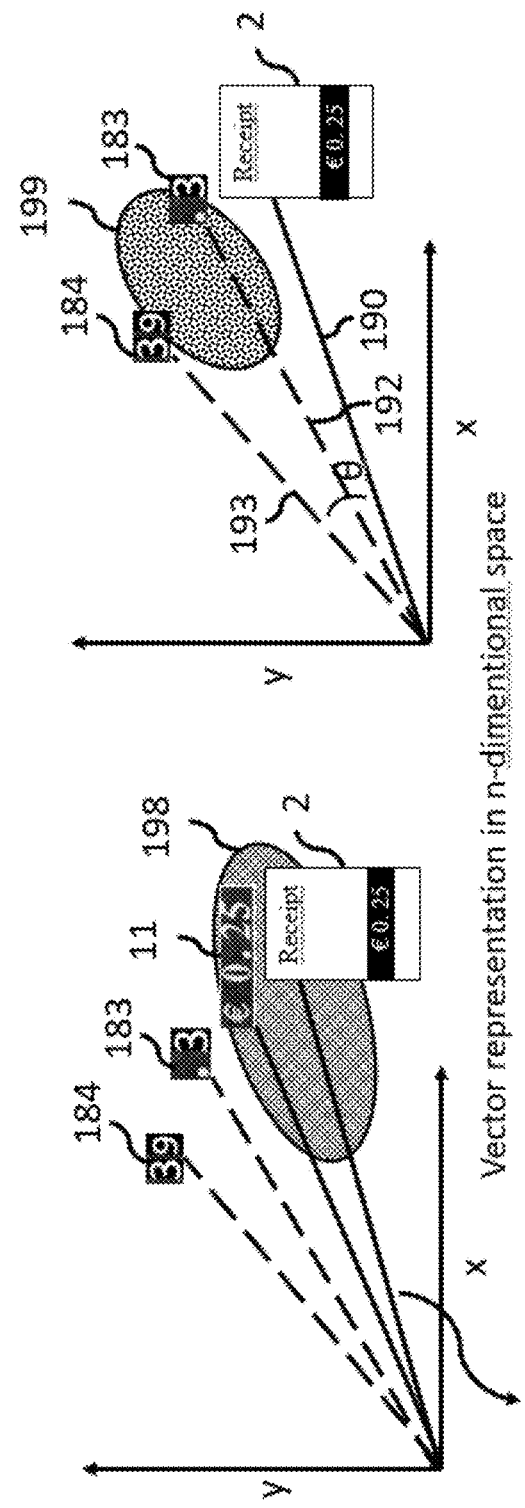
Fig. 17

DISTRIBUTED COMPUTER SYSTEM FOR DOCUMENT AUTHENTICATION

BACKGROUND

The present invention generally relates to a method of auditing a document in order to determine whether the document is genuine and a distributed computer system to carry out the method. The auditing is based on the analysis of areas of interest in an image of the document according to different categories, and score values for each of those categories.

US 2012/0059745 A1 pertains to a method for expense management. An expense data record is retrieved from a trusted source and two or more sub-transactions are identified. The expense data record is then added to an expense report as two or more expense items corresponding to the two or more sub-transactions.

SUMMARY

According to first aspect, a method of automatically auditing a document to determine whether the document is genuine is provided. The method comprises generating an image of the document to be audited, pre-processing of the image to obtain at least one segment of the image with an area of interest and dividing the at least one segment into portions containing single characters and/or combinations of characters. The method further comprises performing a validation of at least two single characters and/or at least two combinations of characters, the validation being carried out for each of the single character and/or character combinations for at least two different categories. The method further comprises creating score values for each category for each validated single character and/or character combination, creating feature vectors for each single character and/or character combination, wherein components of the feature vectors are the score values for the single character and/or character combination for each respective category. The method comprises classifying feature vectors to determine whether the single character or character combination to which the feature vector is associated is genuine.

According to a second aspect, a computer device to automatically audit a document to determine whether a document is genuine is provided. The computer device comprises at least one processor and at least one non-volatile memory comprising at least one computer program with executable instructions stored therein. The executable instructions, when executed by the at least one processor, cause the at least one processor to generate an image of the document to be audited, to pre-process the image to obtain at least one segment of the image with an area of interest, to divide the at least one segment into portions containing single characters and/or combinations of characters. The instructions further cause the processor to perform a validation of at least two single characters and/or at least two combinations of characters, the validation being carried out for each of the single character and/or character combinations for at least two different categories, as well as to create score values for each category for each validated single character and/or character combination and to create feature vectors for each single character and/or character combination, components of the feature vectors being the score values for the single character and/or character combination for each respective category. The instructions further cause the processor to classify the feature vectors to determine whether the single character or character combination to which the feature vector is associated is genuine.

According to a third aspect, a computer program product comprising program code instructions stored on a computer readable medium to execute the method steps according to the second aspect, when said program is executed on a computer, is provided.

According to the first aspect, a method of automatically auditing a document to determine whether the document is genuine is provided. The document may be a receipt, a diploma certificate, a doctoral certificate, or any other test certificate, a lease agreement, a hotel bill to be refunded or any other document of interest that might be subject to forgery.

The document may be tempered with in various ways, such as, inserting handwritten amendments, printing computer edited amendments on the document, manipulating the document using a graphics program, placing adhesive tapes/paper strips with altered content on an area of the document that should be overwritten, such as a pricing field, whipping out certain passages on the document and overwriting them etc.

The method comprises generating an image of the document to be audited. The image may be recorded by a camera of a dedicated scanning device, like an OCR (optical character recognition) scanner or the like. To provide another example, the image recorded by a camera of a multi-purpose mobile device, such as a mobile telephone, a tablet or the like. The device arranged to record the image of the document is, for example, equipped with at least one processor, at least one memory etc., as well, in order to further process the recorded image according to the activities to carry out the method explained in the following.

The dedicated device or application on a multi-purpose device may be, for example, implemented to provide a self-auditing method for e.g. employees of a company who want to check whether receipts they want to file for reimbursement of costs are valid. Further, also approval services for certificates may be implemented using such devices.

The method comprises pre-processing of the image to obtain at least one segment of the image with an area of interest and dividing the at least one segment into portions containing single characters and/or combinations of characters.

The area of interest is, for example, obtained using a YOLO (you only look once) neural network-based object detection algorithm. Areas that contain objects and are therefore non-empty are, for example, recognized as areas of interest by said YOLO based detection algorithm. The pre-processing of the image may further comprise dividing the segments of the image into at least two different sub-segments, wherein at least one of these sub-segments contains at least one character and at least one of these sub-segments does not contain any characters. The identification of characters is, for example, implemented by an OCR algorithm.

The method further comprises performing a validation of at least two single characters and/or at least two combinations of characters. The validation is carried out for each of the single character and/or character combinations for at least two different categories. The categories according to which the validation is performed, may have its foundation in a comparison of two single characters or corresponding groups of characters on the same document to each other. If a group of characters or single character differs from other, in some examples, adjacent (group of) character(s) more than a given threshold, this outlier, may have been subject to forgery.

The validation activities (including those described in the following) may be carried out on the basis of a recurrent convolutional neural network, which has been configured based on a training data set.

The method further comprises creating score values for each category for each validated single character and/or character combination. The score values may be determined by different methods applied to the single character and/or character combination for each category. Feature vectors are created for each single character and/or character combination, wherein components of the feature vectors are the score values for the single character and/or character combination for each respective category. The feature vectors may be used as input for a machine learning technique using an artificial neural network. The entirety of all created feature vectors, for example, forms a feature space for the characters located in the area of interest that are subject to the validation.

The method comprises classifying feature vectors to determine whether the single character or character combination, to which the feature vector is associated, is genuine. As each feature vector in this feature space represents a character or a group of characters, the classification of the feature vector allows conclusions about the properties of the underlying single character and/or group of characters. If, for example, these properties are too dissimilar to the properties of other single characters and/or groups of characters, for example, the deviating characters and/or groups of characters are finally deemed to be not genuine. Even if only a single character on the document to be audited appears not to be genuine, the entire document may be considered to be not genuine.

In some examples, the generation of said segments and/or the validation of the single characters and/or the character combinations and/or associated scoring of values for each category and/or the classification of the feature vectors is performed using an artificial neural network. In such a neural network, at least in one of the initial layers, each feature vector may be associated with a single neuron. The next layer of the neural network would, for example, be associated with functions performing a comparison of the feature vectors, in particular a cluster analysis as further explained below. This next layer could be coupled to the output of the neurons associated with respective feature vectors.

As mentioned above, a YOLO based convolutional artificial neural network may be used, for example, to first separate the empty segments from the non-empty segments of the document and then an OCR algorithm may be used to identify the single characters or group of characters that shall undergo the validation in these first identified non-empty regions.

Subsequently, the validation according to the categories to obtain the score values as components of the feature vectors may also involve applying an artificial neural network based algorithm. As such, for examples, differences with regard to font, background colour, or distance of characters are, for example, evaluated using artificial neural networks to obtain said score values for the categories font, background colour, or distance of characters.

In some examples, the categories used for the validation of the single character and/or character combinations includes at least one of font, overlay, background and foreground, font alignment, readability, completeness, usage of artificial filters, and steganographic manipulation.

Obtaining a score value for the font category may comprise an analysis of font deviations of characters under validation from characters adjacent to or in vicinity of the analysed characters. Obtaining a score value for the overlay category may comprise an analysis to whether digital or physical overlays have been used to cover certain characters on the document. For physical overlays, for example, a height difference between the character and the surrounding of the character may be evaluated. The readability, for example, may be evaluated on the basis of error values resulting from an OCR algorithm to obtain the respective score value. The usage of artificial filters may be detected, for example, by tracing artefacts of artificial filter use and consequently obtaining a score value.

In some examples, the validation of the single character and/or character combinations according to the background and foreground category comprises a bonding analysis of a character in a portion. The bonding analysis may comprise a comparison of the foreground and background of a character to be validated. For example, sharp transitions between foreground and background of a character are seen as an indication of manipulation and the score value is for the character in the category background and foreground is set accordingly.

In some examples, the validation of the single character and/or the character combination according to the font alignment category comprises obtaining the distance between two adjacent characters and/or combination of characters. In the font alignment category validation, for example, the distance between every other character in a group of character is determined. The score levels might be to a value indicating a low risk of manipulation if the distance between characters is uniformly distributed or even equal among the group of characters. However, for such characters that show a deviating distance to the other characters of the group, the score value may be set as to indicate a correspondingly higher risk of manipulation.

In some examples, the validation of the single character and/or the character combination according to the artificial filter category comprises passing each character through an analysis dedicated to the identification of manipulation caused by artificial filter use. The analysis might be performed based on determining noise distribution over the image, strong edges, lighting, or image metadata analysis. Based on this analysis a score value for the single character or the group of characters validated under the artificial filter category is set.

In some examples, the validation of the single character and/or the character combination according to the steganographic manipulation category comprises an error level analysis applied to the document, wherein the error level analysis comprises a comparison of the image with a compressed version of the image.

To detect certain type forgeries, like a user copying a certain portion of an image from another source, also steganographic features may be derived from the source image. An example for such a forgery would be a user who has tried to copy a date form another receipt and tried to replace it here.

When modifications are very subtle, using just the original image directly to derive final feature vectors of characters could be not sufficient in such cases due to a bad signal to noise ratio of the input. To overcome this, an error level of the image may be calculated, for example, by using a technique called error level analysis, and then the resultant image may be used to compute the feature vectors in addition to features derived from original image. An example for the error level of segments of a document is given by the following formula:

$$\text{Error Level} = \frac{\text{Edited image} - \text{Edited image at 95\% compression}}{\text{Threshold}}$$

To obtain the error level, as in the formula, a compression of the image (e.g. resulting from a conversion to a jpeg file) may have to be calculated. Characters or groups of characters which have been manipulated by e.g. copying data from a different receipt of the same type may show a high error level so that the score value associated with this character or this group of characters may be set corresponding to a high probability of manipulation.

In some examples, the classification involves a cluster analysis, wherein a single-character cluster analysis is performed for each feature vector associated with a corresponding single character. In some examples, this single-character cluster analysis comprises obtaining a similarity indication between at least two feature vectors associated with single characters, wherein, when the similarity indication obtained violates a defined threshold, the single character associated with the corresponding dissimilar feature vector is considered to be non-genuine. Put differently, feature vectors that are comprised by a cluster defined by the similarity indication and the threshold are deemed to be indicative of genuine characters, whereas feature vectors that lie outside this cluster are deemed to be indicative of non-genuine characters.

This single-character cluster analysis is, for example, performed as a first tier in a multi-tier validation that ultimately involves three tiers. The second tier is, for example, the multi-character cluster analysis and the third tier may be the document-wide cluster analysis further described below.

Hence, in some examples, also a multi-character cluster analysis is performed for feature vectors associated with a plurality of characters, and a document-wide cluster analysis is performed for all feature vectors associated with the characters of the document.

Like the single-character analysis, the multi-character cluster analysis, for example, comprises obtaining a similarity indication between at least two feature vectors associated with a combination of characters. If the similarity indication obtained violates a defined threshold, then the plurality of characters associated with the corresponding dissimilar feature vector are considered to be non-genuine. Therefore, the similarity indication and the threshold together define—also for the multi-character cluster analysis—which feature vectors associated with a group of characters lie within or outside a cluster. Those groups of characters associated with feature values lying outside the cluster are deemed to be non-genuine.

In some examples, the document-wide cluster analysis comprises obtaining a similarity indication between a feature vector associated with a single character or a combination of characters, and an aggregated mean feature vector associated with all characters in the entire document. The aggregated mean feature vector associated with all characters in the entire document is, for example, calculated by aggregating the vector components for each single character and for each group of characters that have gone through a respective single character and multi-character analysis.

Aggregating the vector components, for example, involves calculating a mean value of all score values for a particular category to obtain a mean-score value for this category. This mean value would then be the corresponding feature vector component of said feature vector associated with all characters in the entire document. Alternatively, the single-character and/or multi-character score values are, for example, aggregated by summing every up every feature vector component to obtain a respective component of the feature vector associated with all characters.

Like for the single-character cluster analysis and the multi-character cluster analysis, if the similarity indication obtained in the document-wide cluster analysis violates a defined threshold, the single character associated with the corresponding dissimilar feature vector is considered to be non-genuine.

Performing a validation not only on the single character level but in addition also on the level of character combinations and on a document wide level enhances the ability of the method to distinguish between attempts of forgery and minor degradations of receipt quality (dust, dirt, folded etc.). Further, also the precision of the method is enhanced, since forgery attempts like copying segments from similar receipts may not be detected on the single character level but only on the document-wide level by, for example, a comparison of the original document with a compression applied and the original document.

In some examples, obtaining the similarity indication comprises calculating a cosine similarity, wherein the calculation of the cosine similarity comprises calculating a dot product between at least two feature vectors and the magnitude of those at least two feature vectors. This technique may be implemented for calculating the similarity between feature vectors associated with single characters (single-character cluster analysis) and/or for calculating the similarity between feature vectors associated with a group of characters (multi-character cluster analysis), and/or for calculating the similarity between an aggregated mean feature vector associated with all characters and feature vectors associated with single characters and/or groups of characters. Alternatively, a different similarity indication may be used for calculating the similarities in the single-character cluster analysis and/or the multi-character cluster analysis and/or the document-wide cluster analysis.

In some examples, in particular such examples using a cosine similarity, the defined similarity threshold lies between 0 and 1 and the threshold is violated if the similarity indication is equal to or lower than said defined similarity threshold.

As such, for example, to find the similarity between two vectors $A=[a_1, a_2, \ldots, a_n]$ and $B=[b_1, b_2, \ldots, b_n]$, the cosine similarity of these two vectors A and B (or more precisely the cosine of the angle between the two vectors A and B, which represents the similarity score) is calculated using the following formula:

$$\text{similarity score} = \frac{A \cdot B}{\|A\|\|B\|},$$

wherein $\|A\| \|B\|$, corresponds to the (euclidean) $l^2$ norm of the vectors A and B. The calculation of this norm involves the calculation of the dot product A*A and B*B.

The similarity score lies between 0 and 1. A value close to 0 means dissimilar, close to 1 means similar. A threshold t may be defined, where $0 \leq t \leq 1$.

The similarity y may be defined by: where $$y = \begin{cases} \text{similar if } s > t \\ \text{dissimilar if } s \leq t \end{cases}.$$

According to the second aspect, a computer device to automatically audit a document to determine whether a document is genuine is provided. The computer device comprises at least one processor and at least one non-volatile memory comprising at least one computer program with executable instructions stored therein. The executable instructions, when executed by the at least one processor, cause the at least one processor to generate an image of the document to be audited, to pre-process the image to obtain at least one segment of the image with an area of interest, to divide the at least one segment into portions containing single characters and/or combinations of characters. The instructions further cause the processor to perform a validation of at least two single characters and/or at least two combinations of characters, the validation being carried out for each of the single character and/or character combinations for at least two different categories, as well as to create score values for each category for each validated single character and/or character combination and to create feature vectors for each single character and/or character combination, components of the feature vectors being the score values for the single character and/or character combination for each respective category. The instructions further cause the processor to classify the feature vectors to determine whether the single character or character combination to which the feature vector is associated is genuine.

According to the third aspect, a computer program product comprising program code instructions stored on a computer readable medium to execute the method steps according to the second aspect, when said program is executed on a computer, is provided.

BRIEF DESCRIPTION OF THE DRAWINGS

Examples of the invention are now described, also with reference to the accompanying drawings.

FIG. 17 shows examples for feature vectors associated with characters combinations as well as an aggregated mean feature vector for the entire document in component representation as well as their alignment in a feature space along with clusters encompassing some of these vectors.

The drawings and the description of the drawings are of examples of the invention and are not of the invention itself. Like reference signs refer to like elements throughout the following description of examples.

DETAILED DESCRIPTION

Figure 1:
FIG. 1 shows a mobile device scanning a receipt in order to carry out the method further described in FIGS. 2 to 19.

An example of a mobile device 1, in this example a mobile phone, which is scanning a receipt 2 is illustrated by FIG. 1. An image may be generated by a camera of the mobile device 1 (not shown) that is then further analysed to audit whether and to which extent the receipt 2 is genuine. The audit system may be a self-audit system, with which an employee could check whether the receipt presented is likely to be accepted by, e.g. an expense reimbursement department of his or her company.

Figure 2:
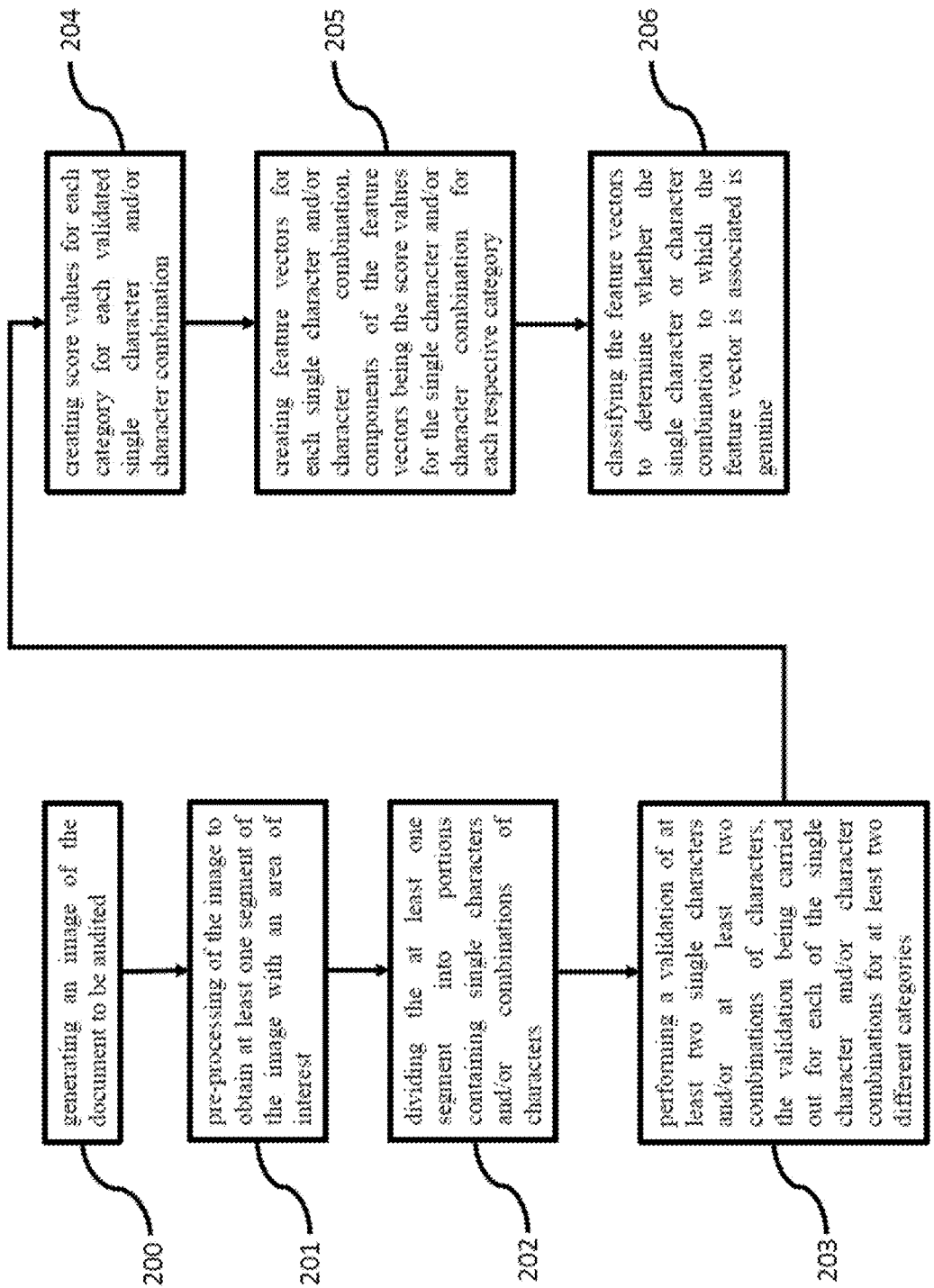
FIG. 2 is a flow chart illustrating activities of the method of automatically auditing a document to determine whether the document is genuine.

A flow chart illustrating activities of the method of automatically auditing a document to determine whether the document is genuine, is illustrated by FIG. 2.

In an activity 200 an image of the document to be audited is generated. In subsequent activity 201, the image is pre-processed to obtain at least one segment of the image with an area of interest. In a subsequent activity 202, the at least one segment is divided into portions containing single characters and/or combinations of characters. In a subsequent activity 203 a validation of at least two single characters and/or at least two combinations of characters is performed. The validation is carried out for each of the single character and/or character combinations for at least two different categories. In a next activity 204, score values are created for each category for each validated single character and/or character combination. In a subsequent activity 205, feature vectors for each single character and/or character combination are created. The components of these feature vectors are score values for the single character and/or character combination for the respective category. In a subsequent activity 206, the feature vectors are classified to determine whether the single character or character combination to which the feature vector is associated is genuine.

Figure 3:
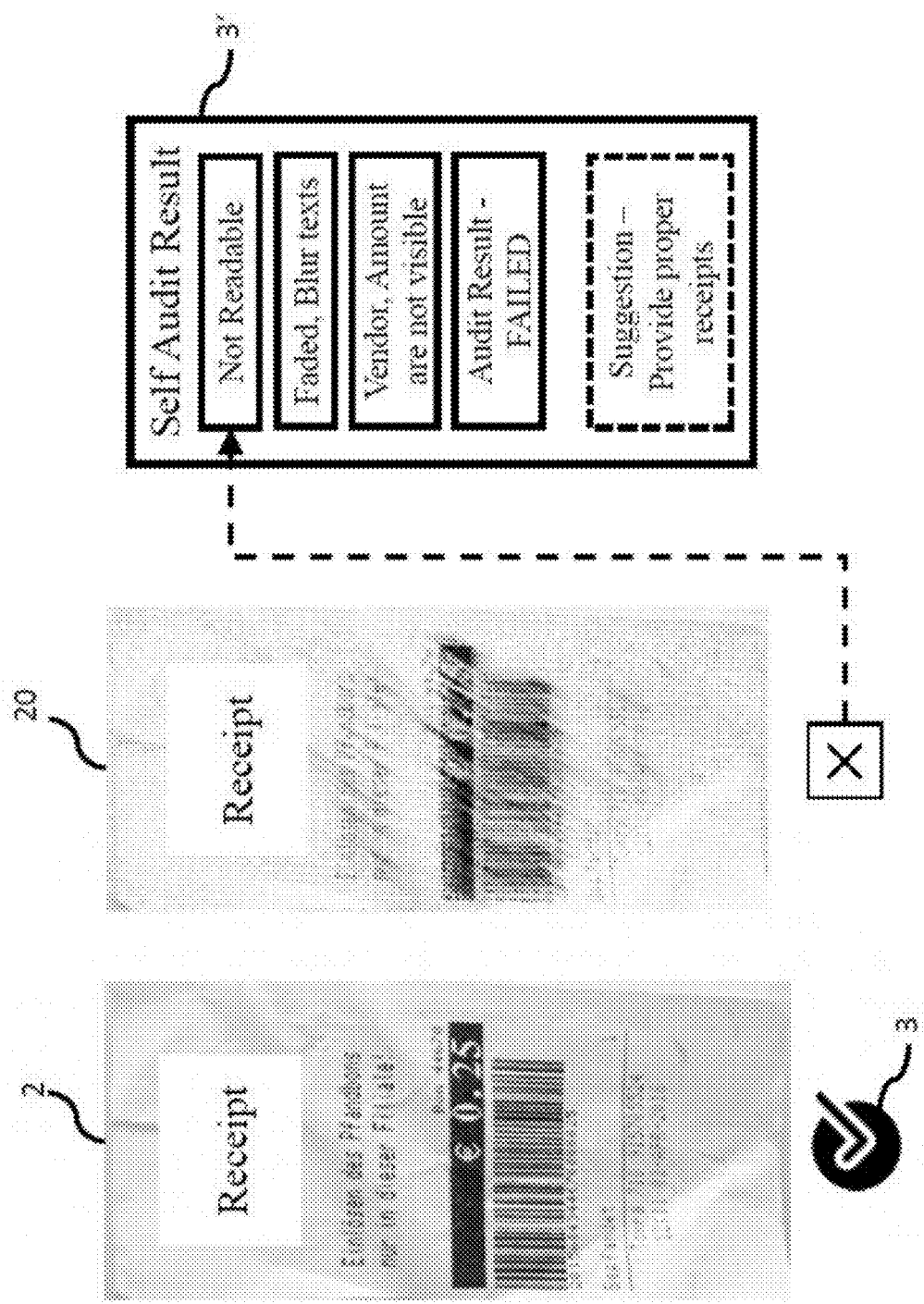
FIG. 3 illustrates different examples for an auditing result.

Two different examples for an auditing result are illustrated by FIG. 3. The audit result 3 (check sign), which is for example shown on a screen of a mobile device 1 (see FIG. 1) indicates that the receipt is genuine and that, for the use case of expense reimbursement, the receipt can be used for said expense reimbursement. The x-sign related to a self-audit result 3' may indicate that the receipt is not accepted, e.g. by an expense reimbursement system. In the specific example illustrated in FIG. 3, the receipt 20 is not accepted since it is not readable. Other grounds for rejection that are also illustrated in FIG. 3 are, for example, faded or blurred text, the vendor or the amount being not visible. The suggestion that may be displayed on a screen of a mobile device 1 is to provide proper receipts.

Figure 4:
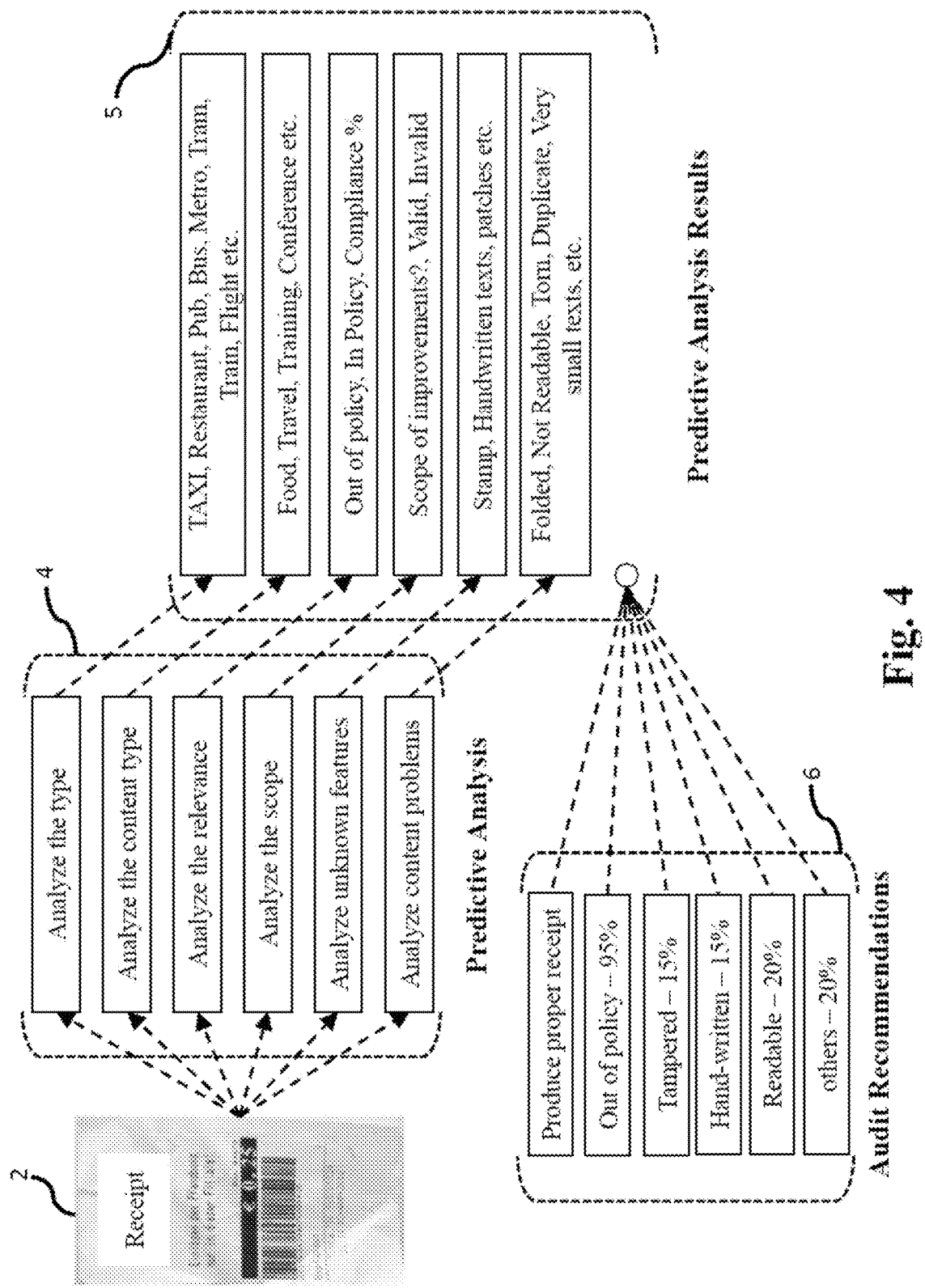
FIG. 4 shows examples of receipt features that are analysed and possible audit recommendations following from the analysis.

Examples of receipt features that are analysed and possible audit recommendations following from the analysis are illustrated by FIG. 4. In the analysis stage 4, the following activities may be performed on the receipt 2: analysing the type, the content type, the relevance or the scope of the receipt. Furthermore, an analysis of potential unknown features or content problems may be performed. The analysis stage is, for example, followed by the following results 5. A possible result of the analysis of the type of the receipt, would be a taxi, a restaurant, a pub, a bus, a metro, tram, train or flight. The result for the content type of the receipt may be food, travel, training, a conference or the lie. The result of the relevant might yield out of policy, in policy or a degree of compliance with policy in percent. The analysis of the scope might result in approving the scope of improvements (e.g. a class upgrade in a flight) as being valid or invalid. The analysis of unknown feature might yield the result that the unknown feature is a stamp, a handwritten text or that patches are present. The analysis of the content problems may provide the result that the receipt is folded, not readable, torn, a duplicate or that the text on the receipt is very small (maybe too small). These results 5 of the analysis 4 might lead to audit recommendations 6. These audit recommendations 6 may be at least one of the following: Produce a proposer receipt, the receipt is out of policy, the receipt is tampered, the receipt has handwritten text on it, or others.

Figure 5:
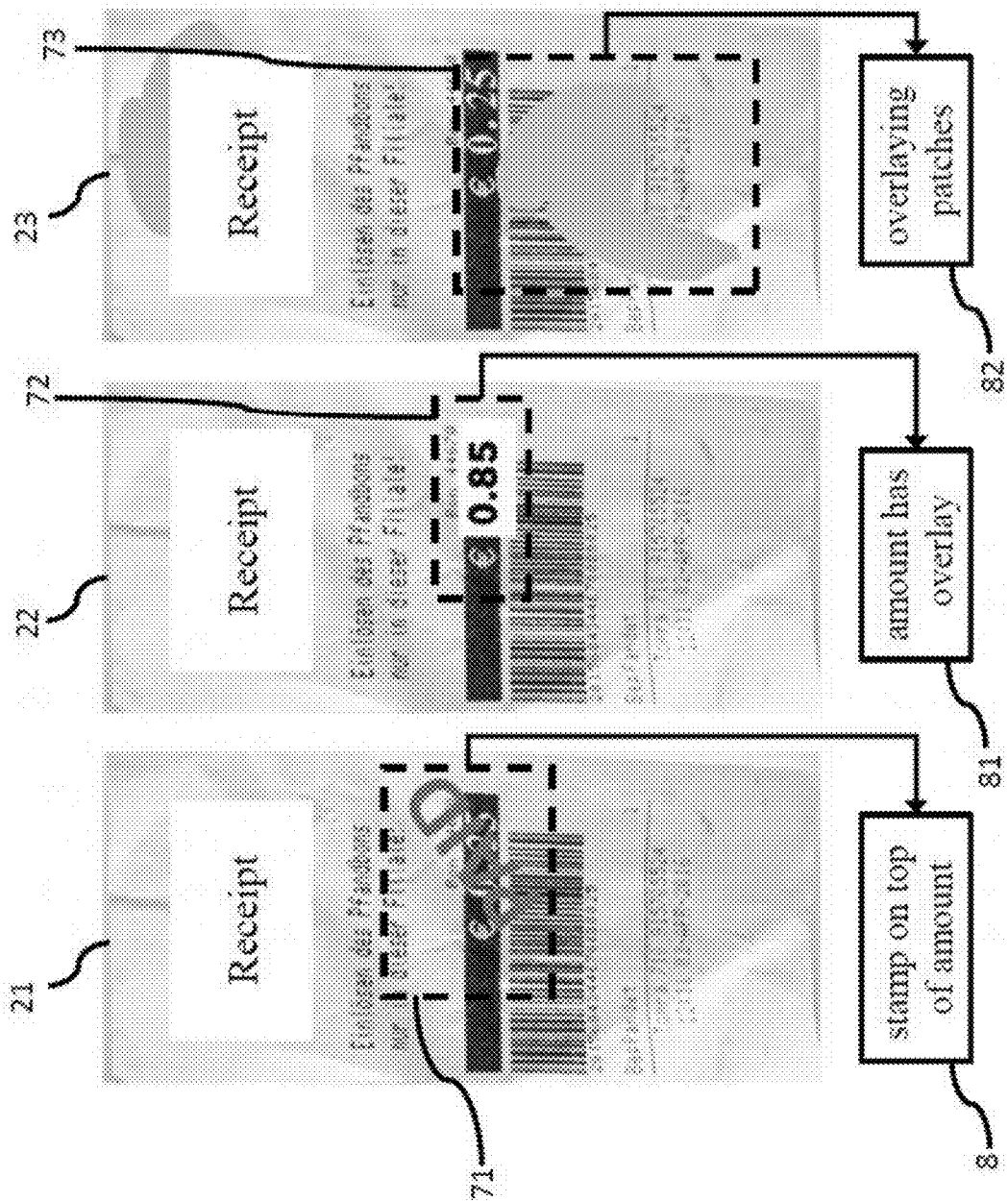
FIG. 5 shows three different examples of manipulated and/or altered receipts.

Three different examples of manipulated and/or altered receipts 21, 22, 23 are shown in FIG. 5. As can be taken from said figure, the area of interest 71 of receipt 21 has been tampered by a stamp over the amount section 8. The area of interest 72 of receipt 22 has been tampered in that the amount has an overlay 81. The area of interest 73 of the receipt 23 has been tampered by overlaying patches 82. In all three cases, the area of interest 71, 72, 73 is an amount field 11 (see also the FIGS. 7 to 8 and 10 to 14).

Figure 6:
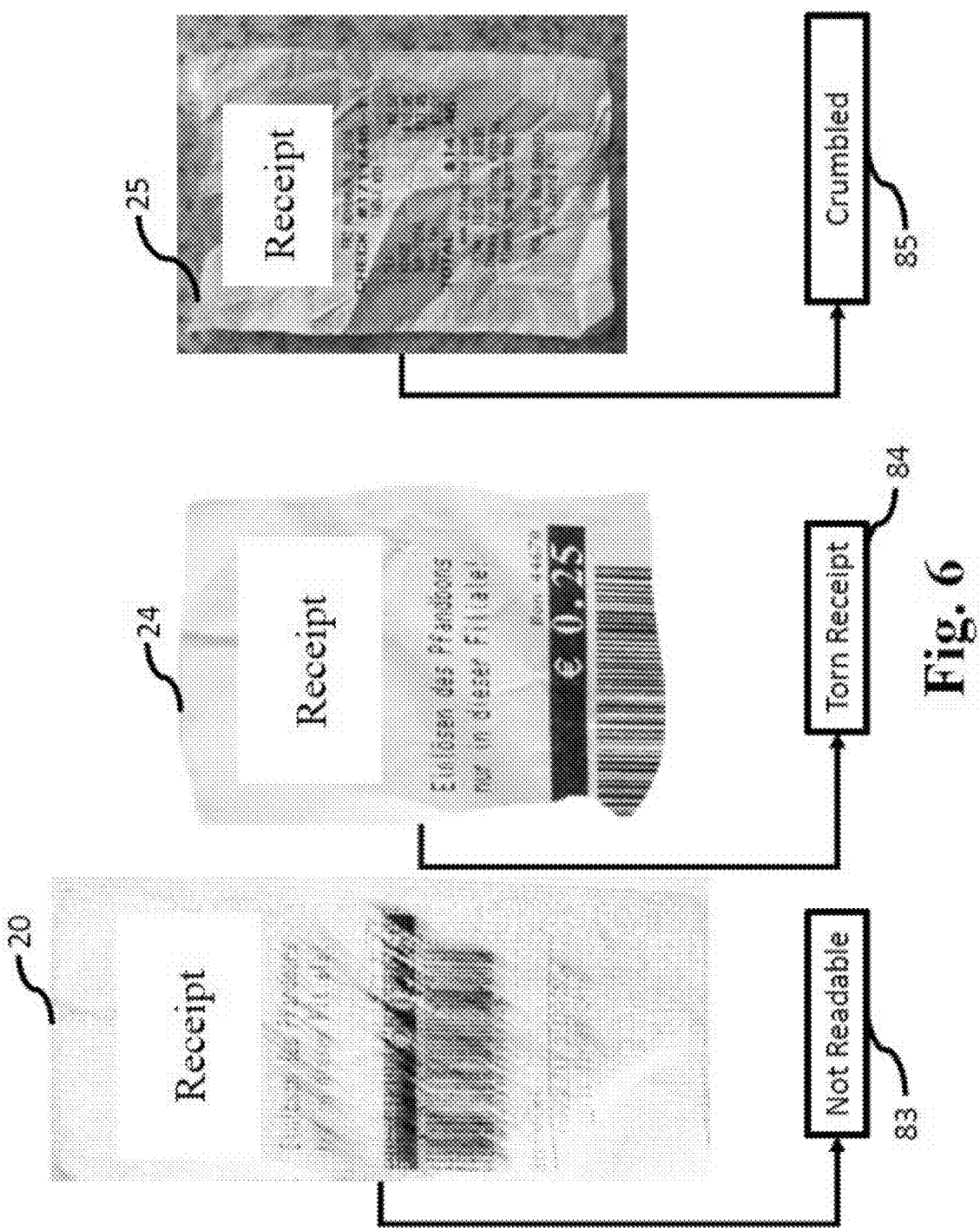
FIG. 6 shows three different examples of degraded receipts.

Three examples of degraded receipts are shown in FIG. 6. The receipt 20 shown there is deemed not readable 20, whereas the receipt 24 is a torn receipt 84 and the receipt 25 is crumbled.

Figure 7:
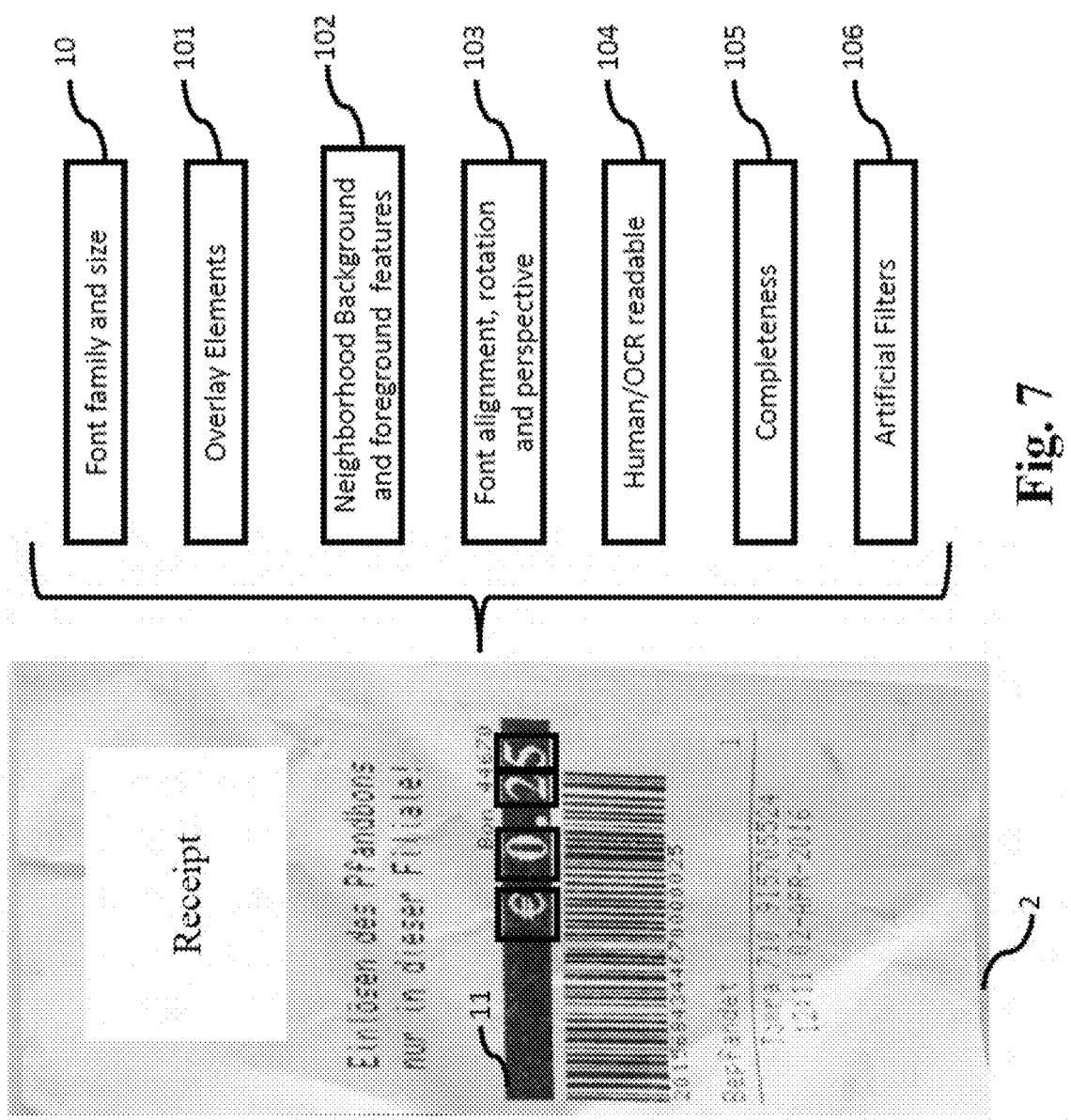
FIG. 7 shows different validation categories for a pricing field of a receipt.

A variety of categories, dependent on which single characters and/or combinations of characters from an amount field 11 of a receipt 2 are validated are shown in FIG. 7. Those categories are font family and size 10, overlay element 101, neighbourhood background and foreground features 102, font alignment, rotation and perspective 103, human/OCR readability 104, completeness 105, and the presence of manipulation by artificial filters 106.

Figure 8:
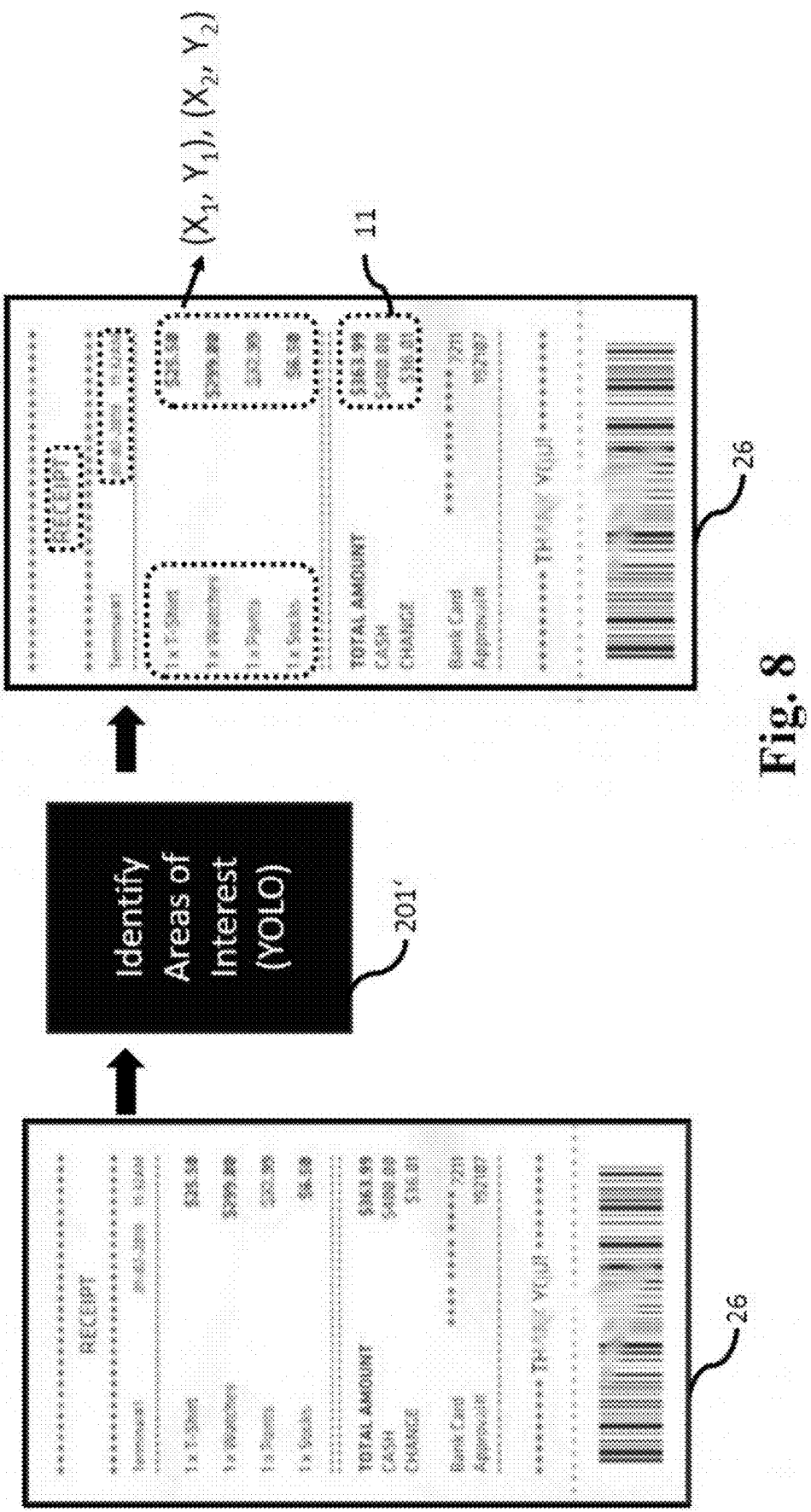
FIG. 8 schematically illustrates an example for identifying areas of interest on a receipt.

An example for identifying areas of interest on a receipt is illustrated by FIG. 8. The recognition of areas of interest 11 on the receipt 26 is carried out here by identifying areas of interest using a YOLO (you only look once) algorithm 201'. The YOLO algorithm may be part of a multilayer artificial neural network that is used to perform the audition to check whether the receipt is genuine.

Figure 9:
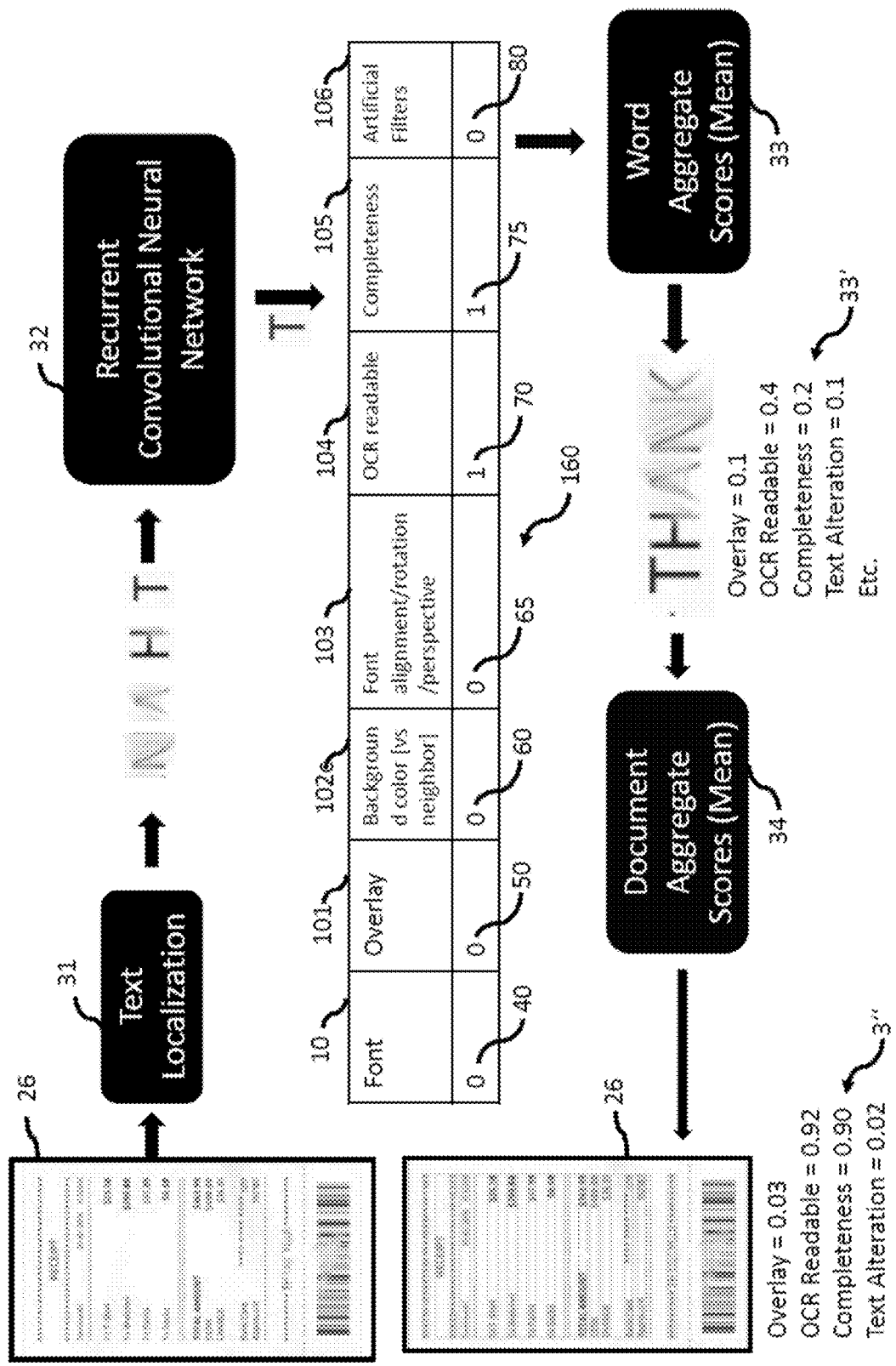
FIG. 9 is a schematic block diagram of an example for a process flow from text localization to the presentation of audit results.

A schematic block diagram of an example for a process flow from text localization to the presentation of audit results is provided by FIG. 9. A text localization algorithm (for example one as the YOLO algorithm, see FIG. 8) is applied to the receipt 26. The segment containing text is analysed using a recurrent convolutional neural network 32.

This analysis results in a variety of score values for each category: In the font category 10, there is a score value 40 with the assumed value 0. For the overlay category 101, the corresponding score value 50 assumes the value 0. In the background (colour) vs foreground (colour) category the corresponding score value 60 also assumes the value 0. The validation in the OCR readability category 104 results in a corresponding score value 70 with a value of 1. A corresponding score 75 in the completeness category 105 has a value of 1. Finally, the validation in the artificial filter category 106 yields a corresponding score value 80 with a value of 0. The validation and scoring performed in this first step may be a single character validation. The overall result is a feature vector 160 with the respective score values 40, 50, 60, 65, 70, 75, 80 for each category as its components. The feature vector of this example has the following shape in component representation: (0, 0, 0, 0, 1, 1, 0).

Either based on the scores for each character, a word aggregate scores (mean) 33 are calculated in the example illustrated by FIG. 9. The result for these aggregate scores is in this example: Overlay=0.1; OCR readability=0.4; Completeness=0.2, text alteration=0.1 etc. The word aggregate scores (mean) could be calculated based on previously calculated single character scores. However, they could also be calculated from scratch by passing character combinations recognized as words through a validation according to the above-mentioned categories.

In the example of FIG. 9, also document aggregate score (mean) are, for example, calculated, for example, based on scores for single characters or on the word aggregate (mean) scores. Also here, the score could alternatively be calculated from scratch. In the example illustrated by FIG. 9, the document aggregate (mean) score values are as follows: Overlay=0.03; OCR readable=0.92; Completeness=0.90; text alteration=0.02.

Figure 10:
FIG. 10 shows examples of score values for different areas of on the receipt.

An example for a concrete scoring of concrete passages on the receipt 2 is provided by FIG. 10. The amount field 11 yields a score 13 of 99%. The text "Einlösen des Pfandbonds nur in dieser Filiale!" yields an overall score 13a of 89%. The bar code gets a score value 13b of 59%. The serial number and date field, when validated, receives a score value 13c of 59%.

Figure 11:
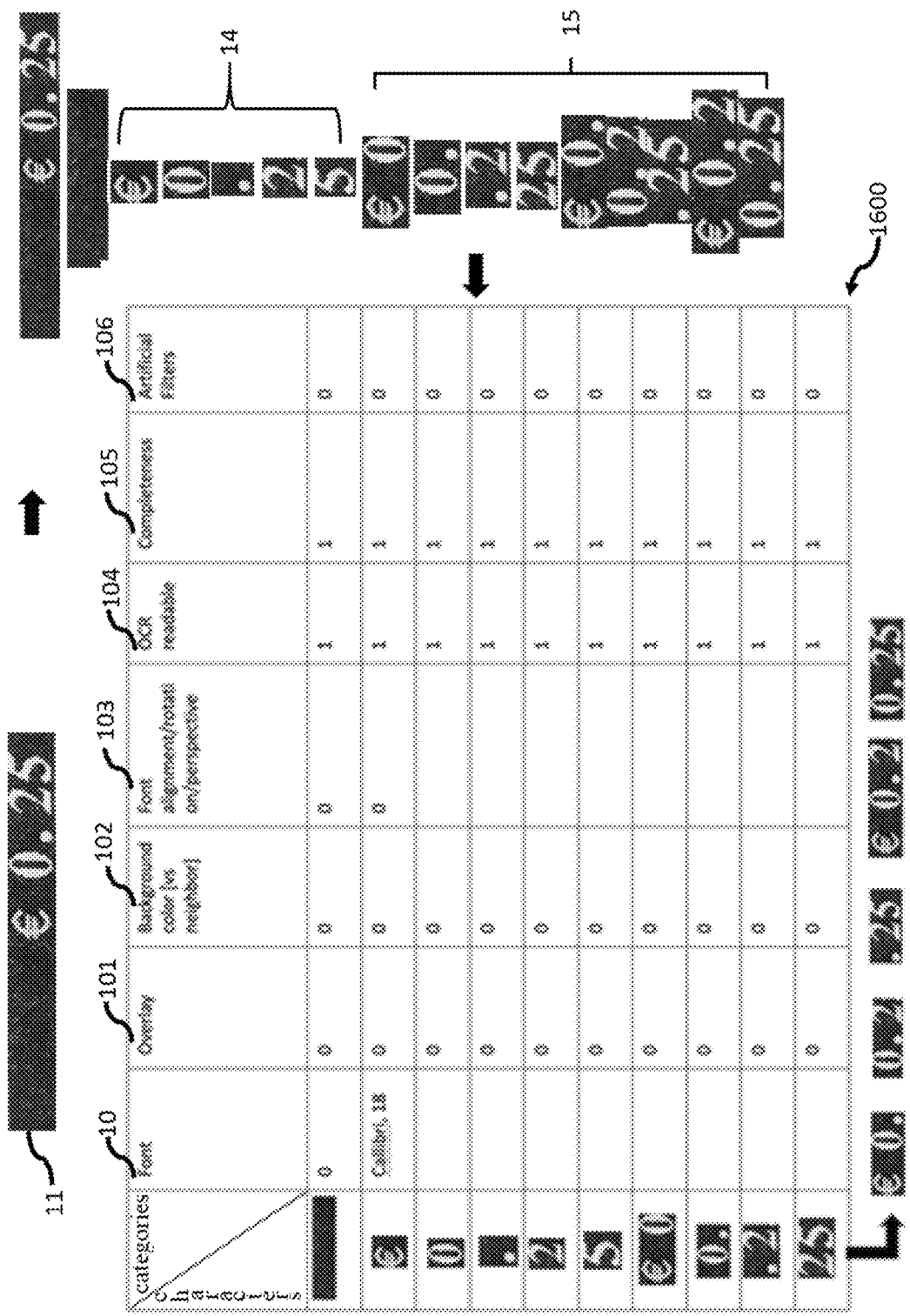
FIG. 11 shows a table illustrating examples for different score values for different single characters and character combinations for different categories.

A plurality of feature vectors resulting from a single character and a combination of character analysis of the amount field 11 with the entry "€ 0.25" is schematically illustrated in FIG. 11. The five single characters "€", "0", ".", "2", "5" 14 are validated according to the same categories as in the example of FIG. 9 to obtain five corresponding feature vectors (see FIGS. 9, 15 to 17). The entry "€ 0.25" is further subdivided into the character combinations "€ 0", "0.", "0.2", "25", "€ 0.", "0.2", "0.25", "€ 0.2", "0.25" 15. The values from the resulting feature vectors can be taken from the table 1600 shown in FIG. 11.

Figure 12:
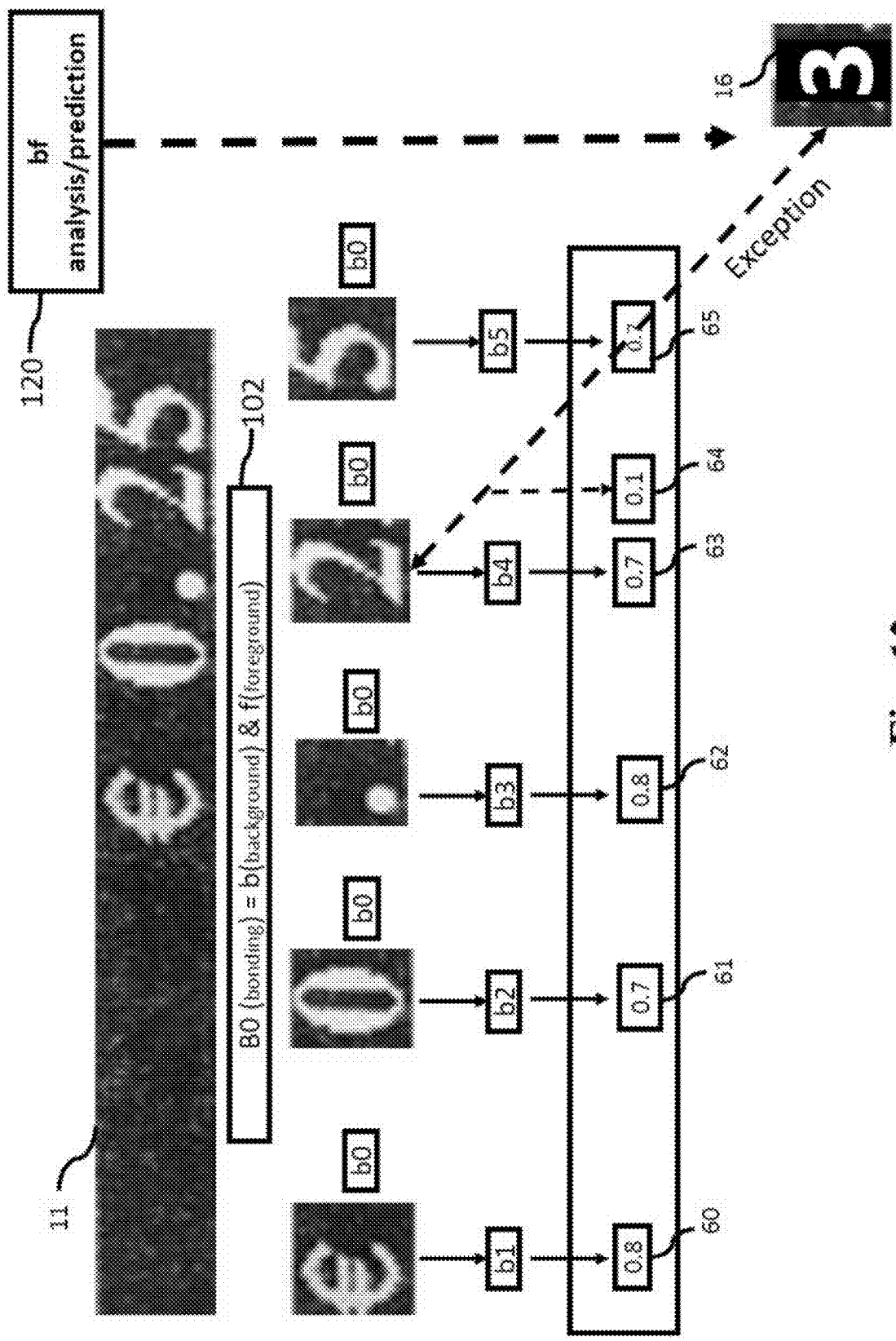
FIG. 12 shows an example for a validation of single characters in the pricing field in the background and foreground (bonding) category.

An example for a validation of single characters in the pricing field 11 in the background and foreground (bonding) category 102 (see FIGS. 9 and 11) is shown in FIG. 12. The single characters "€", "0", ".", "2" and "5" are extracted from the amount field 11 using, for example, by applying a YOLO algorithm and an OCR algorithm. These single characters then undergo a validation using a background and foreground analysis algorithm that is for example based on an artificial neural network. The bonding analysis, for example, is performed by comparing the area immediately surrounding a character and the character itself (foreground) with the background the character in which the character is embedded. For example, if there is a sudden transition in colour and/or texture, the outcome of the validation regarding this character would be a score value indicative of an anomaly (possibly a forgery).

The background and foreground analysis/prediction 120 as shown in FIG. 12 is illustrated there once for an authentic version of the character "2" and once for a tampered version of the character "2" 16. In the tampered version of "2" 16 a pad with the figure "3" has been put over the actual figure "2". As can be seen in FIG. 12, the score value 60 resulting from the validation of the character "€" is 0.8, the score value 61 for the character "0" is 0.7, the score value 62 for the character "." is 0.8, the score value 63 for the untampered character "2" is 0.7, while the score value 64 for the tampered character is 0.1. The score value 65 results from the character "5". The score value 63 for the untampered character "2" 0.7 significantly differs from the score value for the tampered character 16 being 0.1. Further, as can be taken by comparing the score values 81, 81, 82, 83 and 85.

Figure 13:
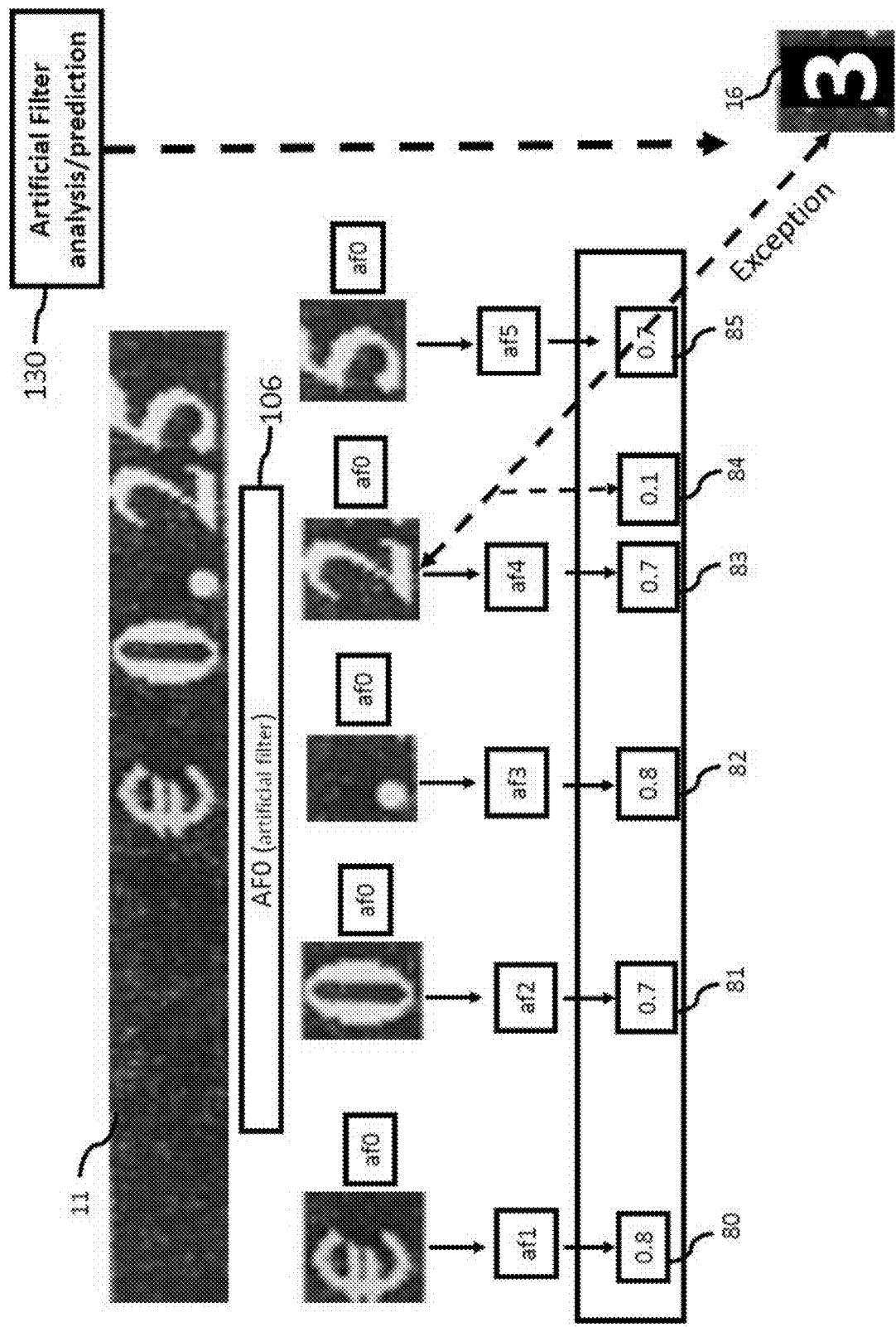
FIG. 13 shows an example for a validation of single characters in the pricing field in the artificial filter analysis category.

An example for a validation of single characters in the pricing field 11 in the artificial filter category 106 (see FIGS. 9 and 11) is shown in FIG. 13. The same validation principle as FIG. 12 may be applied here (artificial neural network-based validation), with also the artificial filter validation 130 providing a significantly deviating score value for the tampered character "3".

Figure 14:
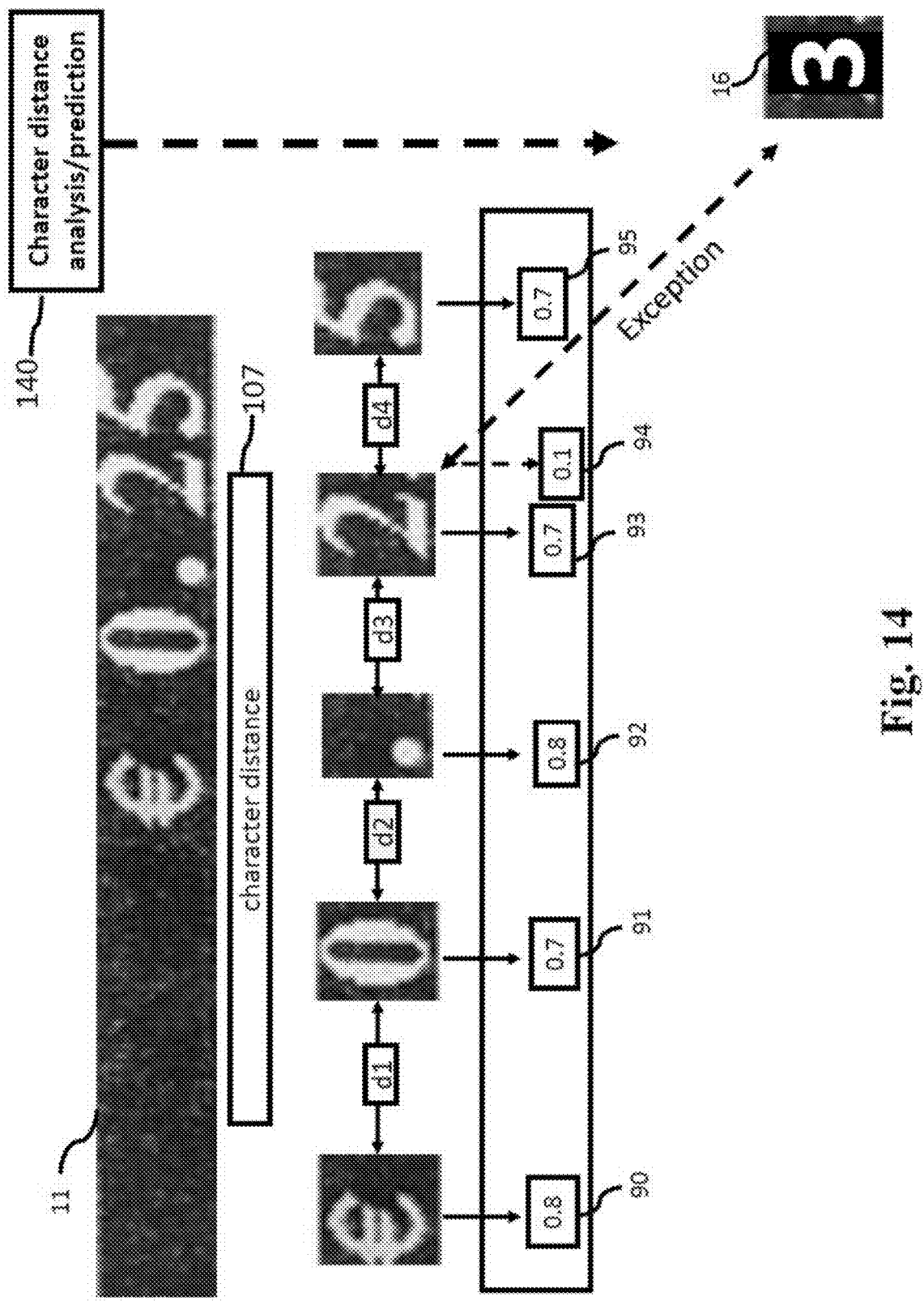
FIG. 14 shows an example for a validation of single characters in the pricing field in the character distance category.

An example for a validation of single characters in the pricing field 11 in the character distance category 140 is shown in FIG. 14. The same validation principle as FIGS. 12 and 13 may be applied here (artificial neural network-based validation), with also the character distance validation 140 providing a significantly deviating score value for the tampered character "3". In this validation a score value 90, 91, 92, 93, 94, 95 is dedicated to the distance of a character to adjacent characters, so that deviating distances, indicative of manipulation, can be identified.

Figure 15:
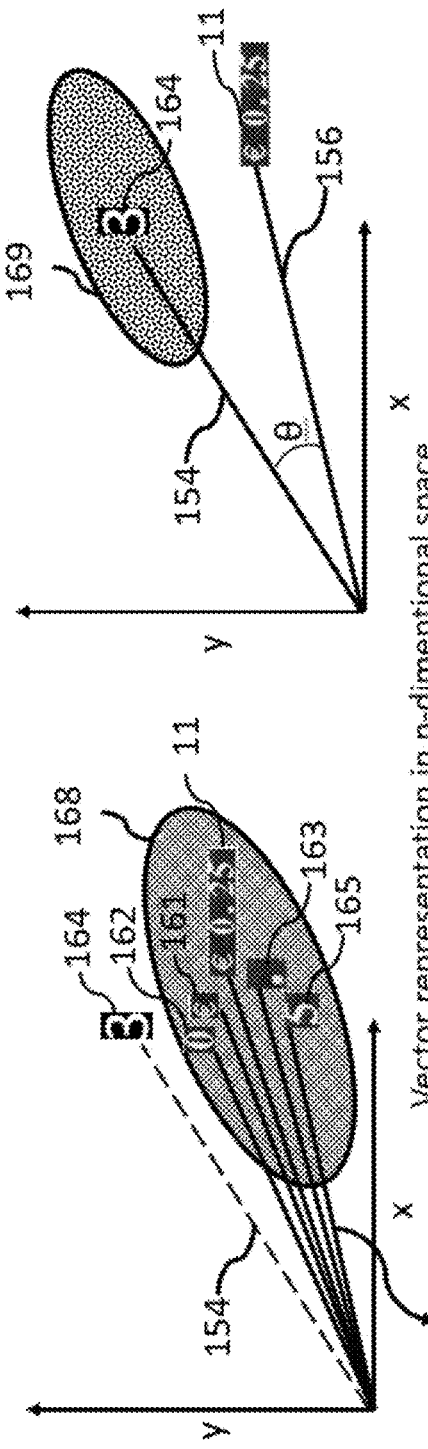
FIG. 15 shows examples for feature vectors associated with single characters formed based on a manipulated character combination in component representation as well as in their alignment in a feature space and groups. along with clusters encompassing some of these vectors.

A set of feature vectors 150 to 155 obtained from a pricing field 11' are shown in FIG. 15. The feature vectors 150 to 155 depicted there are presented in component representation as well as embedded in a coordinate system to schematically show their alignment in an n-dimensional feature space.

The first feature vector 150 is associated with the entire character combination "€ 0.35", including a manipulated character "3", that should actually read "2" (see FIGS. 12 to 14). The score values for the corresponding categories (see FIGS. 9 to 14) for the combination of characters "€ 0.35" are the components of the feature vector 150. The feature vectors associated with the single characters "€", "0", ".", "3" and "5" 150 to 155 also have score values resulting from a validation according to the above-mentioned categories as their components. The feature vector 151 is associated with the character "€", the feature vector 152 is associated with the character "0", the feature vector 153 is associated with the character ".", the feature vector 154 is associated with the manipulated character "3" and the feature vector 155 is associated with the character "5".

The alignment of the feature vectors 151, 152, 153, associated with single characters "€", "0", "." respectively, and of feature vector 150 associated with the untampered character combination "€ 0.25" is illustrated in a feature space (x,y) coordinate system in the lower left corner of FIG. 15. As can be seen there, the feature vectors associated with genuine characters 151 to 153 and 156 are aligned within a cluster 168, in which also the hypothetical feature vector of a genuine character combination "€ 0.25" 11 lies. The feature vector associated with the tampered character "3" 164, however, lies outside this cluster 168.

As depicted in the lower right corner of FIG. 15, an outside cluster 169 can be defined, wherein each feature vector associated with a character or character combination lying inside this outside cluster 169 is defined to be indicative of a manipulation since the angle between a feature vector associated with the genuine character combination 11 is bigger than a threshold. The feature vector 154 associated with the tampered character "3" 164 lies inside this cluster 169.

Figure 16:
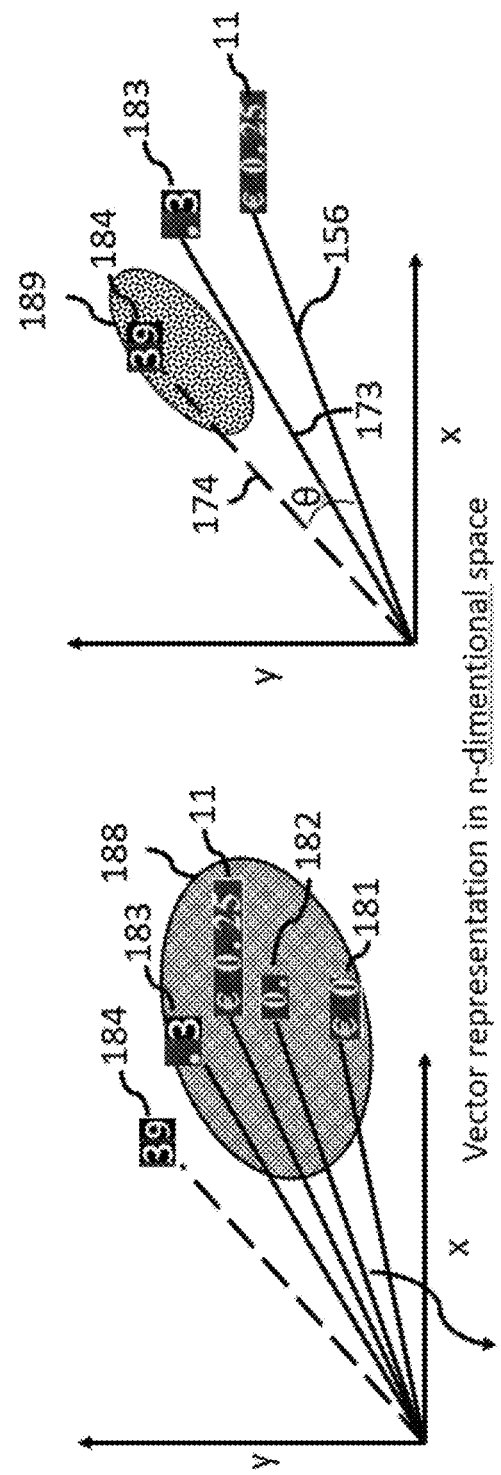
FIG. 16 shows examples for feature vectors associated with a character combination formed based on a manipulated character combination in component representation as well as in their alignment in a feature space along with clusters encompassing some of these vectors.

A component representation of feature vectors 170 to 174 associated with combinations of characters 11", 181 to 184, and the schematic alignment of these vectors in an n-dimensional feature space is illustrated by FIG. 16.

The feature vector is 170 is associated with the character combination "€ 0.39" 11", of which the single characters "3" and "9" are manipulated. The feature vector 171 is associated with the character combination "€ 0" 181, the feature vector 172 is associated with the character combination "0." 182, the feature vector 173 is associated with the partly tampered character combination "0.3" 183 and the feature vector 174 is associated with the entirely tampered character combination "39" 184.

Like in FIG. 15, the alignment of certain feature vectors and a cluster of certain feature vectors is shown in the lower left corner of FIG. 16. The feature vectors 171 to 174 and the feature vector 175 (see FIG. 15) are aligned within a cluster 188 in the n-dimensional feature space depicted there. The only feature vector that is outside the cluster 188 is the feature vector 174 associated with the entirely tampered character combination "39" 184.

As can be seen in the feature space representation shown in the lower right corner of FIG. 16, an outside cluster 189 could be defined around the feature vector 174 associated with character combination "39" 184. Note that dependent on the defined size of the outside cluster 189, the character combination "39" 184 may be recognized as manipulated since it lies within said cluster.

Examples for feature vectors associated with characters combinations 191, 192, 193 as well as an aggregated mean feature vector associated with all characters in the entire document 190 are depicted in FIG. 17. As for FIGS. 15 and 16, these feature vectors 190, 191, 192, 193, are depicted in component representation as well as their alignment in a feature space along with clusters encompassing some of these vectors.

As mentioned above, creating the aggregated mean feature vector, for example, involves calculating a mean value of all score values for a particular category to obtain a mean-score value for this category. This mean value would then be the corresponding feature vector component of said feature vector associated with all characters in the entire document. Alternatively, the single-character and/or multi-character score values are, for example, aggregated by summing every up every feature vector component to obtain a respective component of the feature vector associated with all characters.

As in FIG. 16, the example presented in FIG. 17 relates to the manipulated character combination "€ 0.39" 170 (see FIG. 16), wherein the characters "25" have been replaced by the characters "39".

In the example illustrated by FIG. 17, the aggregated mean feature vector 190 is associated with an aggregated score for the entire document. The feature vector 191 is associated with the tampered character combination "€ 0.39" whilst the feature vector 192 is associated with the character combination "0.3" and the feature vector 193 is associated with the character combination "39".

A cluster 198 is defined that lies outside the aggregated mean feature vector associated with all characters in the entire document 190. It can be seen in the feature space representation in the lower left corner of FIG. 17, that the feature vectors associated with the character combinations "0.3" and "39" lie outside this cluster 198, whilst the hypothetical vector associated with the genuine character combination "€ 0.25" lies within said cluster 198.

As can be seen in the depiction in the lower right-hand side of FIG. 17, an outside cluster 199 can be defined that includes both feature vectors 192 and 193 associated with the character combinations "0.3" and "39", respectively.

Whether or not a feature vector lies within a cluster 168, 188, 198, 169, 189, 199 may depend on the similarity between two feature vectors.

Figure 18:
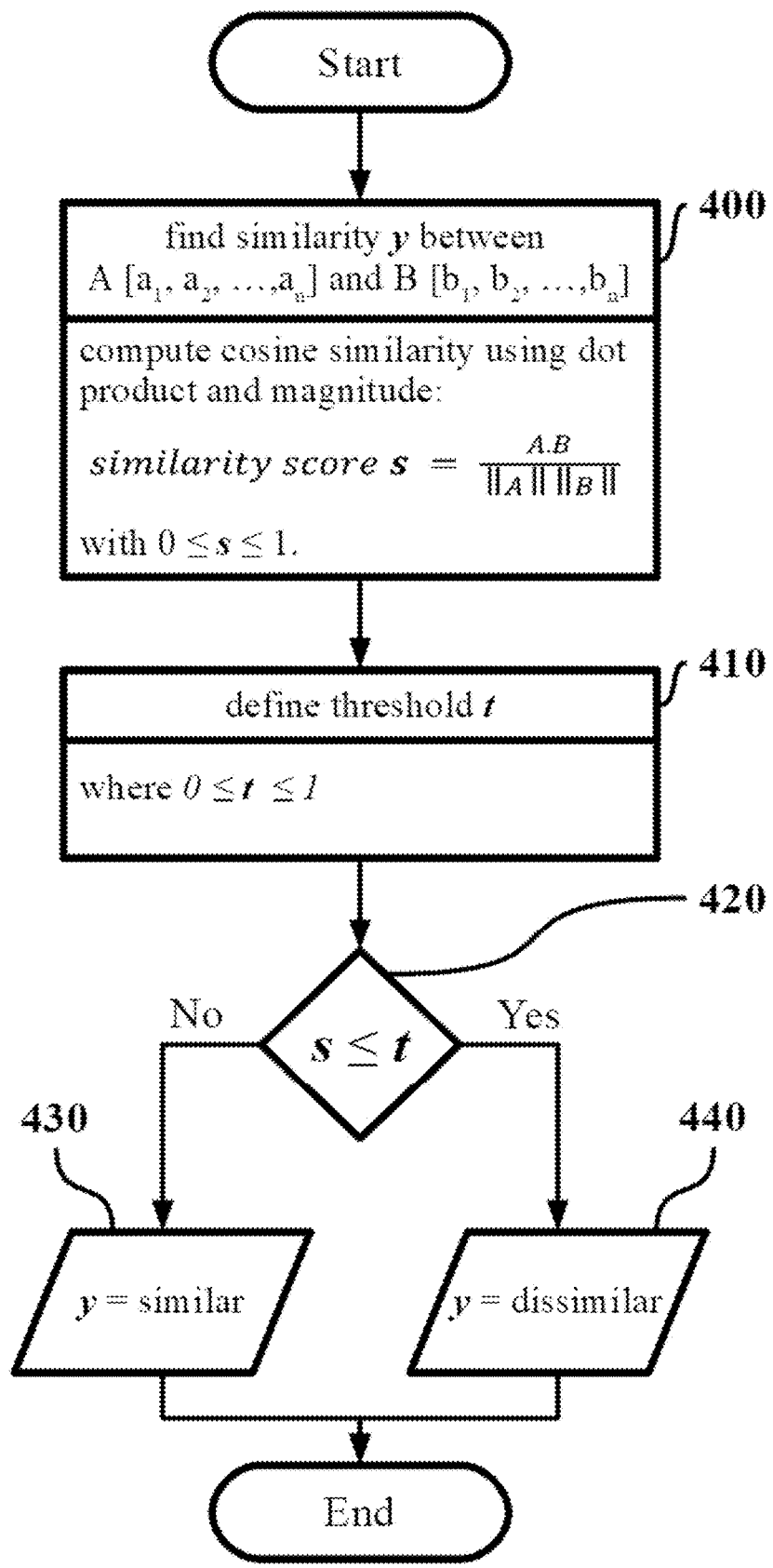
FIG. 18 illustrates a schematic flow diagram of an example for a method of calculating a similarity indication of feature vectors.

A schematic flow diagram of an example for a method of calculating such a similarity indication of feature vectors is shown in FIG. 18.

In an activity 400 to find the similarity y between two vectors A=[$a_1, a_2, \ldots, a_n$] and B=[$b_1, b_2, \ldots, b_n$], the cosine similarity of these two vectors A and B (or more precisely the cosine of the angle between the two vectors A and B, which represents the similarity score) is calculated using the following formula:

$$\text{similarity score} = \frac{A \cdot B}{\|A\| \|B\|},$$

wherein ‖A‖ ‖B‖, corresponds to the (euclidean) $l^2$ norm of the vectors A and B and the similarity score s lies between 0 and 1. The calculation of this norm involves the calculation of the dot product A*A and B*B.

Subsequently, a threshold t is defined in an activity 410, wherein the threshold lies between 0 and 1. Thereafter in a comparison activity 420 it is checked whether the similarity score s is equal or smaller than the defined threshold t.

In response to the comparison activity 420 yielding the result that the similarity score s is not smaller or equal to the threshold t the feature vectors A and B are considered to be dissimilar in activity 440. In response to the comparison activity 420 resulting in the finding that the similarity score s is indeed smaller or equal to the threshold t, the feature vectors A and B are considered to be similar in activity 430.

By choosing the threshold value t accordingly, a more or less restrictive similarity criterion can be set. As mentioned above, the similarity score s, corresponding to the cosine of the angle between two feature vectors may define the size of a cluster just as those described in conjunction with FIGS. 15 to 17.

Figure 19:
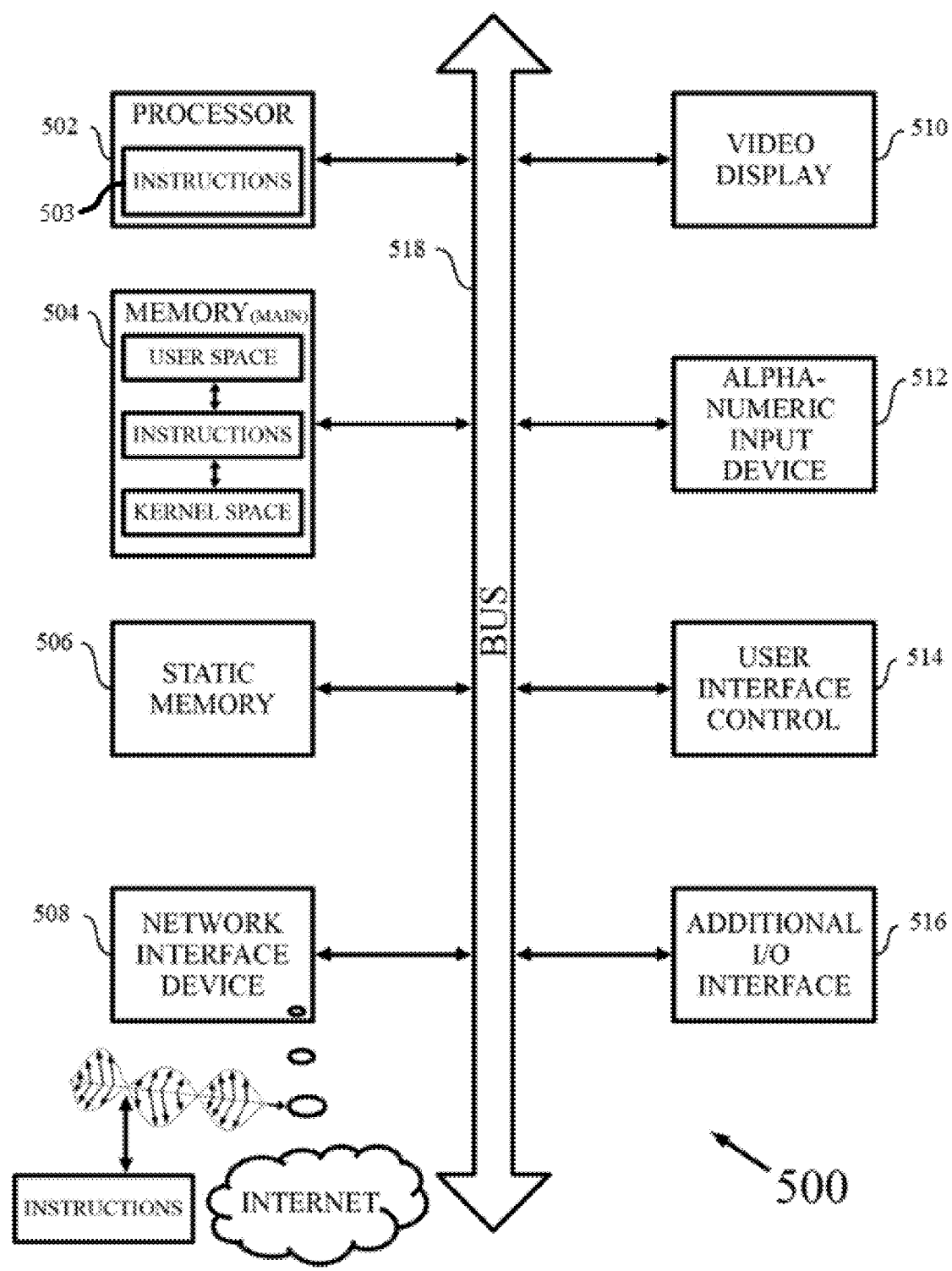
FIG. 19 shows a schematic computerized system on which the methods illustrated by FIGS. 2 to 18 could be implemented.

A diagrammatic representation of an exemplary computer system 500 is shown in FIG. 19. The processor 502 is arranged to execute a set of instructions 503, to cause the computer system 500 to perform any of the methodologies used for the method of automatically auditing a document to determine whether the document is genuine, as described herein. The mobile device 1 (see FIG. 1) might be arranged like this.

The computer system 500 includes a processor 502, a main memory 504 and a network interface 508. The main memory 504 includes a user space, which is associated with user-run applications, and a kernel space, which is reserved for operating-system- and hardware-associated applications. The computer system 500 further includes a static memory 506, e.g. non-removable flash and/or solid state drive and/or a removable Micro or Mini SD card, which permanently stores software enabling the computer system 500 to execute functions of the computer system 500. Furthermore, it may include a video display 510, a user interface control module 514 and/or an alpha-numeric and cursor input device 512. Optionally, additional I/O interfaces 516, such as card reader and USB interfaces may be present. The computer system components 502 to 516 are interconnected by a data bus 518.

In some exemplary embodiments the software programmed to carry out the method described herein is stored on the static memory 506; in other exemplary embodiments external databases are used.

An executable set of instructions (i.e. software) 503 embodying any one, or all, of the methodologies described above, resides completely, or at least partially, permanently in the non-volatile memory 506. When being executed, process data resides in the main memory 504 and/or the processor 502.

What is claimed is:

1. A method comprising:
   generating an image of a document to be audited;
   pre-processing the image to obtain at least one segment of the image with an area of interest;
   dividing the at least one segment into portions containing single characters and/or combinations of characters;
   performing a validation of a plurality of single characters and/or a plurality of combinations of characters, wherein the validation is carried out for each of the single character and/or character combinations for at least two different categories;
   creating score values for each category for each validated single character and/or each character combination;
   creating feature vectors for each single character and/or each character combination, wherein components of the feature vectors are the score values for the single character and/or the character combination for each respective category; and
   classifying the feature vectors to determine whether the single character or the character combination to which the feature vector is associated is genuine,
   wherein the validation of the single characters and/or the character combinations and/or associated scoring of values for each category and/or the classification of the feature vectors is performed using an artificial neural network,
   wherein the classification involves a cluster analysis,
   wherein a single-character cluster analysis is performed for each feature vector associated with a corresponding single character, a multi-character cluster analysis is performed for feature vectors associated with a plurality of characters, and a document-wide cluster analysis is performed for all feature vectors associated with the characters of the document,
   wherein the document-wide cluster analysis comprises obtaining a similarity indication between a feature vector associated with a single character or a combination of characters, and an aggregated mean feature vector associated with all characters in the document, and wherein, when the similarity indication violates a defined similarity threshold, the single character associated with a corresponding dissimilar feature vector is considered to be non-genuine.

2. The method of claim 1, wherein the at least two different categories used for the validation of the single characters and/or the character combinations include a font category, an overlay category, a background and foreground category, a font alignment category, a readability category, a completeness category, a usage of artificial filters category, a steganographic manipulation category, or a combination thereof.

3. The method of claim 2, wherein the validation of the single characters and/or the character combinations according to the background and foreground category comprises a bonding analysis of a character in a portion.

4. The method of claim 2, wherein the validation of the single characters and/or the character combinations according to the font alignment category comprises obtaining a distance between two adjacent characters and/or two adjacent combinations of characters.

5. The method of claim 2, wherein the validation of the single characters and/or the character combinations according to the artificial filter category comprises passing each character through an analysis dedicated to identification of manipulation caused by artificial filter use.

6. The method of claim 2, wherein the validation of the single characters and/or the character combinations according to the steganographic manipulation category comprises an error level analysis applied to the document, wherein the error level analysis comprises a comparison of the image with a compressed version of the image.

7. The method of claim 1, wherein the single-character cluster analysis comprises obtaining a similarity indication between at least two feature vectors associated with single characters, wherein, when the similarity indication violates the defined similarity threshold, the single character associated with the corresponding dissimilar feature vector is considered to be non-genuine; and wherein the multi-character cluster analysis comprises obtaining a similarity indication between at least two feature vectors associated with a combination of characters, wherein, when the similarity indication violates the defined similarity threshold, the plurality of characters associated with the corresponding dissimilar feature vector are considered to be non-genuine.

8. The method of claim 1, wherein obtaining the similarity indication comprises calculating a cosine similarity, wherein calculating the cosine similarity comprises calculating a dot product between at least two feature vectors and a magnitude of the at least two feature vectors.

9. The method of claim 8, wherein the defined similarity threshold lies between 0 and 1, and the defined similarity threshold is violated if the similarity indication is equal to or lower than the defined similarity threshold.

10. A computer device comprising:
at least one processor; and
at least one non-volatile memory comprising, executable instructions that, when executed by the at least one processor, cause the at least one processor to:
generate an image of a document to be audited;
pre-process the image to obtain at least one segment of the image with an area of interest;
divide the at least one segment into portions containing single characters and/or combinations of characters;
perform a validation of at least two single characters and/or at least two combinations of characters, wherein the validation is carried out for each of the single character and/or the character combinations for at least two different categories;
create score values for each category for each validated single character and/or each validated character combination;
create feature vectors for each single character and/or character combination, wherein components of the feature vectors are the score values for the single character and/or the character combination for each respective category; and
classify the feature vectors to determine whether the single character or the character combination to which the feature vector is associated is genuine,
wherein the validation of the single characters and/or the character combinations and/or associated scoring of values for each category and/or the classification of the feature vectors is performed using an artificial neural network,
wherein the classification involves a cluster analysis,
wherein a single-character cluster analysis is performed for each feature vector associated with a corresponding single character, a multi-character cluster analysis is performed for feature vectors associated with a plurality of characters, and a document-wide cluster analysis is performed for all feature vectors associated with the characters of the document,
wherein the document-wide cluster analysis comprises obtaining a similarity indication between a feature vector associated with a single character or a combination of characters, and an aggregated mean feature vector associated with all characters in the document, and
wherein, when the similarity indication violates a defined similarity threshold, the single character associated with a corresponding dissimilar feature vector is considered to be non-genuine.

11. The computer device of claim 10, wherein the at least two different categories used for the validation of the single characters and/or the character combinations include a font category, an overlay category, a background and foreground category, a font alignment category, a readability category, a completeness category, a usage of artificial filters category, a steganographic manipulation category, or a combination thereof.

12. The computer device of claim 11, wherein the validation of the single characters and/or the character combinations according to the background and foreground category comprises a bonding analysis of a character in a portion.

13. The computer device of claim 11, wherein the validation of the single characters and/or the character combinations according to the font alignment category comprises obtaining a distance between two adjacent characters and/or two adjacent combinations of characters.

14. The computer device of claim 11, wherein the validation of the single characters and/or the character combinations according to the artificial filter category comprises passing each character through an analysis dedicated to identification of manipulation caused by artificial filter use.

15. The computer device of claim 11, wherein the validation of the single characters and/or the character combinations according to the steganographic manipulation category comprises an error level analysis applied to the document, wherein the error level analysis comprises a comparison of the image with a compressed version of the image.

16. The computer device of claim 10, wherein the single-character cluster analysis comprises obtaining a similarity indication between at least two feature vectors associated with single characters, wherein, when the similarity indication violates the defined similarity threshold, the single character associated with the corresponding dissimilar feature vector is considered to be non-genuine; and wherein the multi-character cluster analysis comprises obtaining a similarity indication between at least two feature vectors associated with a combination of characters, wherein, when the similarity indication violates the defined similarity threshold, the plurality of characters associated with the corresponding dissimilar feature vector are considered to be non-genuine.

17. The computer device of claim 10, wherein obtaining the similarity indication comprises calculating a cosine similarity, wherein calculating the cosine similarity comprises calculating a dot product between at least two feature vectors and a magnitude of the at least two feature vectors.

18. The computer device of claim 17, wherein the defined similarity threshold lies between 0 and 1, and the defined similarity threshold is violated if the similarity indication is equal to or lower than the defined similarity threshold.

19. A non-transitory computer-readable storage medium encoded with a computer program, the computer program comprising a plurality of program code instructions that when executed by one or more processors cause the one or more processors to perform operations comprising:

generate an image of a document to be audited;

pre-process the image to obtain at least one segment of the image with an area of interest;

divide the at least one segment into portions containing single characters and/or combinations of characters;

perform a validation of at least two single characters and/or at least two combinations of characters, wherein the validation is carried out for each of the single character and/or the character combinations for at least two different categories;

create score values for each category for each validated single character and/or each validated character combination;

create feature vectors for each single character and/or each character combination, wherein components of the feature vectors are the score values for the single character and/or character combination for each respective category; and classify the feature vectors to determine whether the single character or the character combination to which the feature vector is associated is genuine, wherein the validation of the single characters and/or the character combinations and/or associated scoring of values for each category and/or the classification of the feature vectors is performed using an artificial neural network, wherein the classification involves a cluster analysis, wherein a single-character cluster analysis is performed for each feature vector associated with a corresponding single character, a multi-character cluster analysis is performed for feature vectors associated with a plurality of characters, and a document-wide cluster analysis is performed for all feature vectors associated with the characters of the document, wherein the document-wide cluster analysis comprises obtaining a similarity indication between a feature vector associated with a single character or a combination of characters, and an aggregated mean feature vector associated with all characters in the document, and wherein, when the similarity indication violates a defined similarity threshold, the single character associated with a corresponding dissimilar feature vector is considered to be non-genuine.

* * * * *